US008922628B2

(12) United States Patent
Bond

(10) Patent No.: US 8,922,628 B2
(45) Date of Patent: Dec. 30, 2014

(54) SYSTEM AND PROCESS FOR TRANSFORMING TWO-DIMENSIONAL IMAGES INTO THREE-DIMENSIONAL IMAGES

(75) Inventor: Chris Bond, Los Angeles, CA (US)

(73) Assignee: Prime Focus VFX Services II Inc., Hollywood, CA (US)

( * ) Notice: Subject to any disclaimer, the term of this patent is extended or adjusted under 35 U.S.C. 154(b) by 836 days.

(21) Appl. No.: 12/874,190

(22) Filed: Sep. 1, 2010

(65) Prior Publication Data

US 2011/0050864 A1 Mar. 3, 2011

Related U.S. Application Data

(60) Provisional application No. 61/239,049, filed on Sep. 1, 2009.

(51) Int. Cl.
*H04N 13/04* (2006.01)
*H04N 13/02* (2006.01)
*G06T 7/00* (2006.01)

(52) U.S. Cl.
CPC ......... *H04N 13/026* (2013.01); *H04N 13/0404* (2013.01); *H04N 13/0495* (2013.01); *G06T 7/0071* (2013.01); *G06T 7/0075* (2013.01)
USPC ............. 348/51; 348/46; 345/6; 345/419; 345/506; 345/680; 382/154; 382/164

(58) Field of Classification Search
CPC ................................................. H04N 13/026
USPC ............................................................ 348/51
See application file for complete search history.

(56) References Cited

U.S. PATENT DOCUMENTS

| 5,691,843 | A | * | 11/1997 | O'Neill | 359/464 |
| 5,850,352 | A | | 12/1998 | Moezzi et al. | |
| 5,929,859 | A | | 7/1999 | Meijers | |
| 6,208,348 | B1 | * | 3/2001 | Kaye | 345/419 |
| 6,400,831 | B2 | | 6/2002 | Lee et al. | |
| 6,515,659 | B1 | | 2/2003 | Kaye et al. | |
| 6,686,926 | B1 | * | 2/2004 | Kaye | 345/680 |
| 7,102,633 | B2 | * | 9/2006 | Kaye et al. | 345/419 |
| 7,116,323 | B2 | | 10/2006 | Kaye et al. | |
| 7,116,324 | B2 | | 10/2006 | Kaye et al. | |

(Continued)

FOREIGN PATENT DOCUMENTS

EP 1353518 A1 10/2003

OTHER PUBLICATIONS

NPL—Creating full view panoramic image mosaics and environment maps (Microsoft Research, 1997).*
NPL—How to make-3D-Photos (wikihow—using Photoshop).*

(Continued)

*Primary Examiner* — William C. Vaughn, Jr.
*Assistant Examiner* — Luis M Perez
(74) *Attorney, Agent, or Firm* — Fulwider Patton LLP

(57) ABSTRACT

A system and process is provided for the conversion of a stream of two-dimensional images into a pair of streams of images for providing the perception of a stream of three-dimensional images. Each complimentary image in the image stream undergoes the application of a selection and remapping process to independently alter portions of the image, so that the remappings shift the image elements in a manner which produces a stereo depth effect when the images are viewed through the appropriate viewing device.

18 Claims, 14 Drawing Sheets

(56) References Cited

U.S. PATENT DOCUMENTS

| | | | |
|---|---|---|---|
| 7,932,874 B2* | 4/2011 | Kurahashi et al. | 345/6 |
| 7,944,464 B2* | 5/2011 | Fukushima et al. | 348/51 |
| 8,427,488 B2* | 4/2013 | Hirai et al. | 345/506 |
| 8,705,847 B2* | 4/2014 | Kuo et al. | 382/154 |
| 8,761,501 B2* | 6/2014 | Lee et al. | 382/164 |
| 2003/0091225 A1* | 5/2003 | Chen | 382/145 |
| 2007/0159476 A1* | 7/2007 | Grasnick | 345/419 |
| 2011/0050864 A1* | 3/2011 | Bond | 348/51 |
| 2012/0086775 A1* | 4/2012 | Bae et al. | 348/46 |

OTHER PUBLICATIONS

Lewis Wallace, "Video: How IMAX Wizards Convert Harry Potter to 3-D, wired.com," Aug. 6, 2009 (last visited Aug. 26, 2010), https://www.wired.com/underwire/2009/08/video-how-imax-wizards-convert-harry-potter-to-3-d.

International Search Report, ISA/US, dated Oct. 20, 2010, p. 1-2.

* cited by examiner

*FIG. 5A*
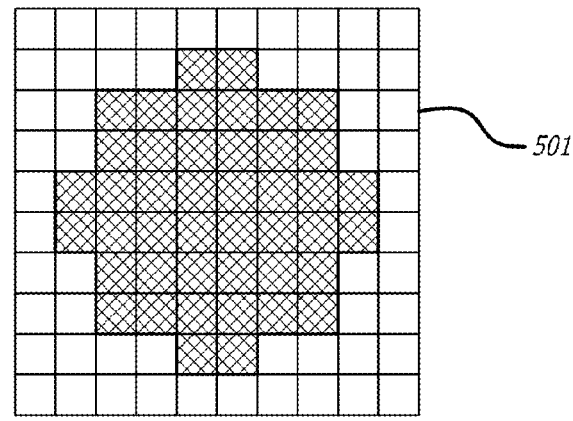
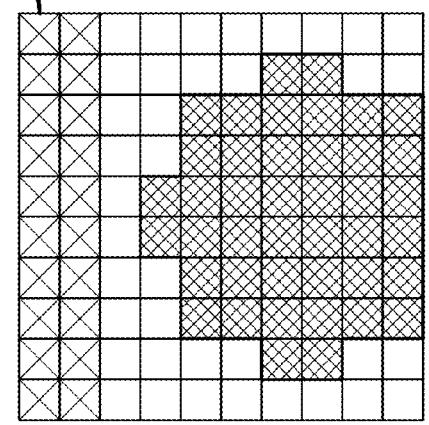 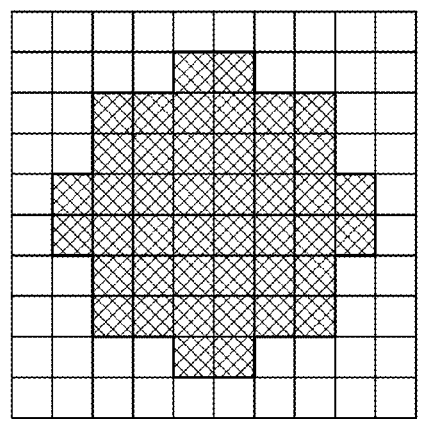
*FIG. 5B*
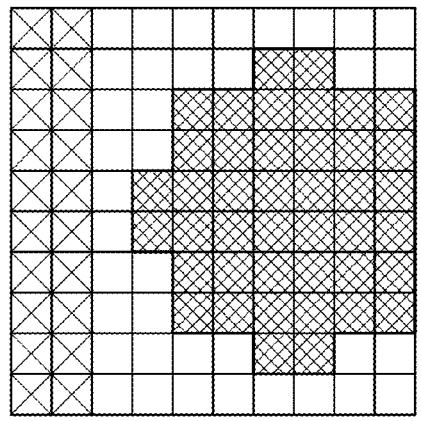 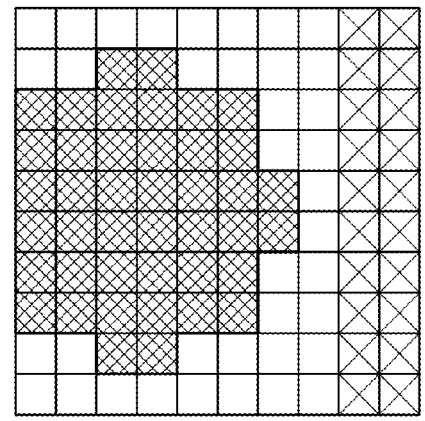
*FIG. 5C*

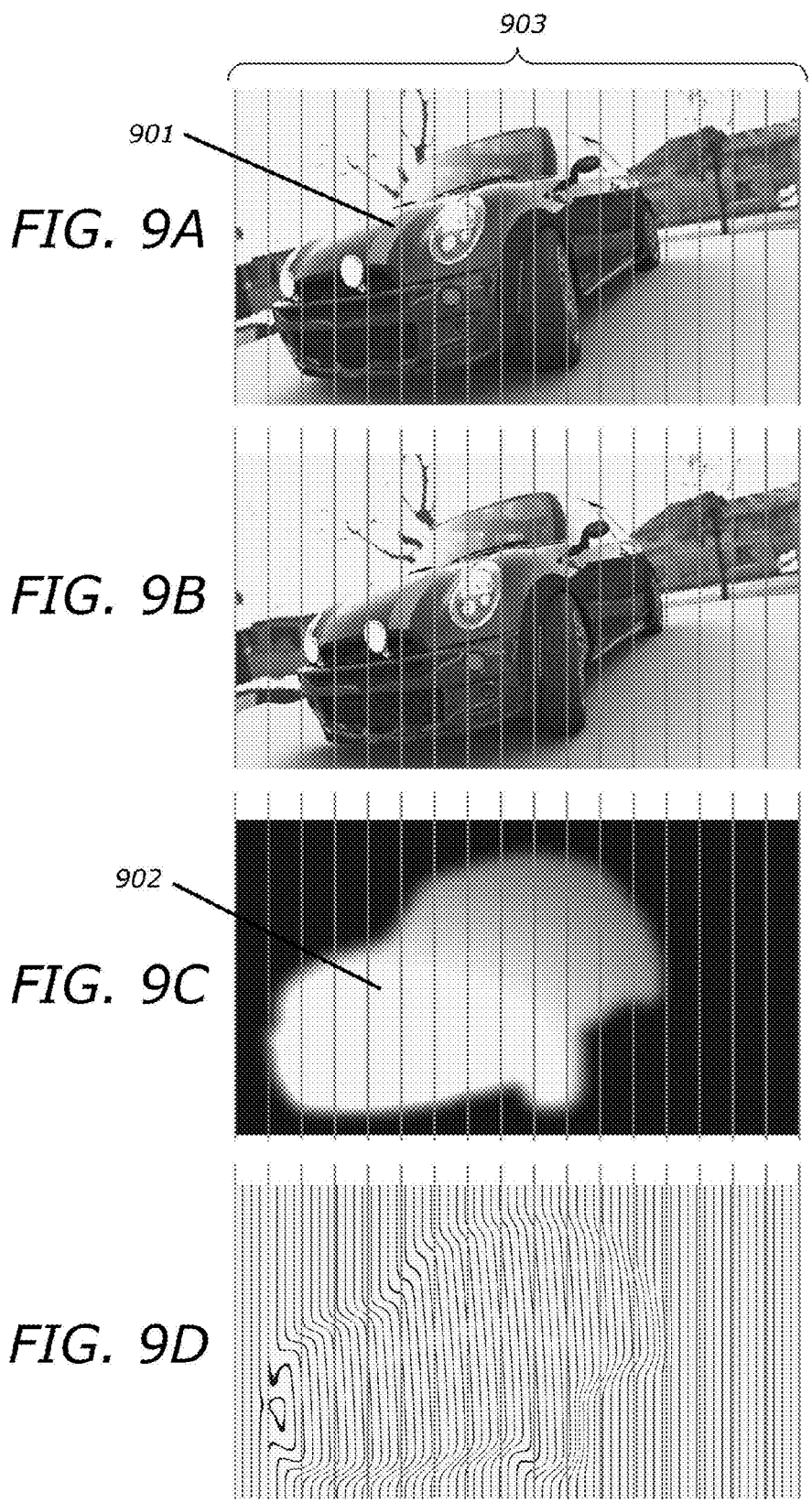

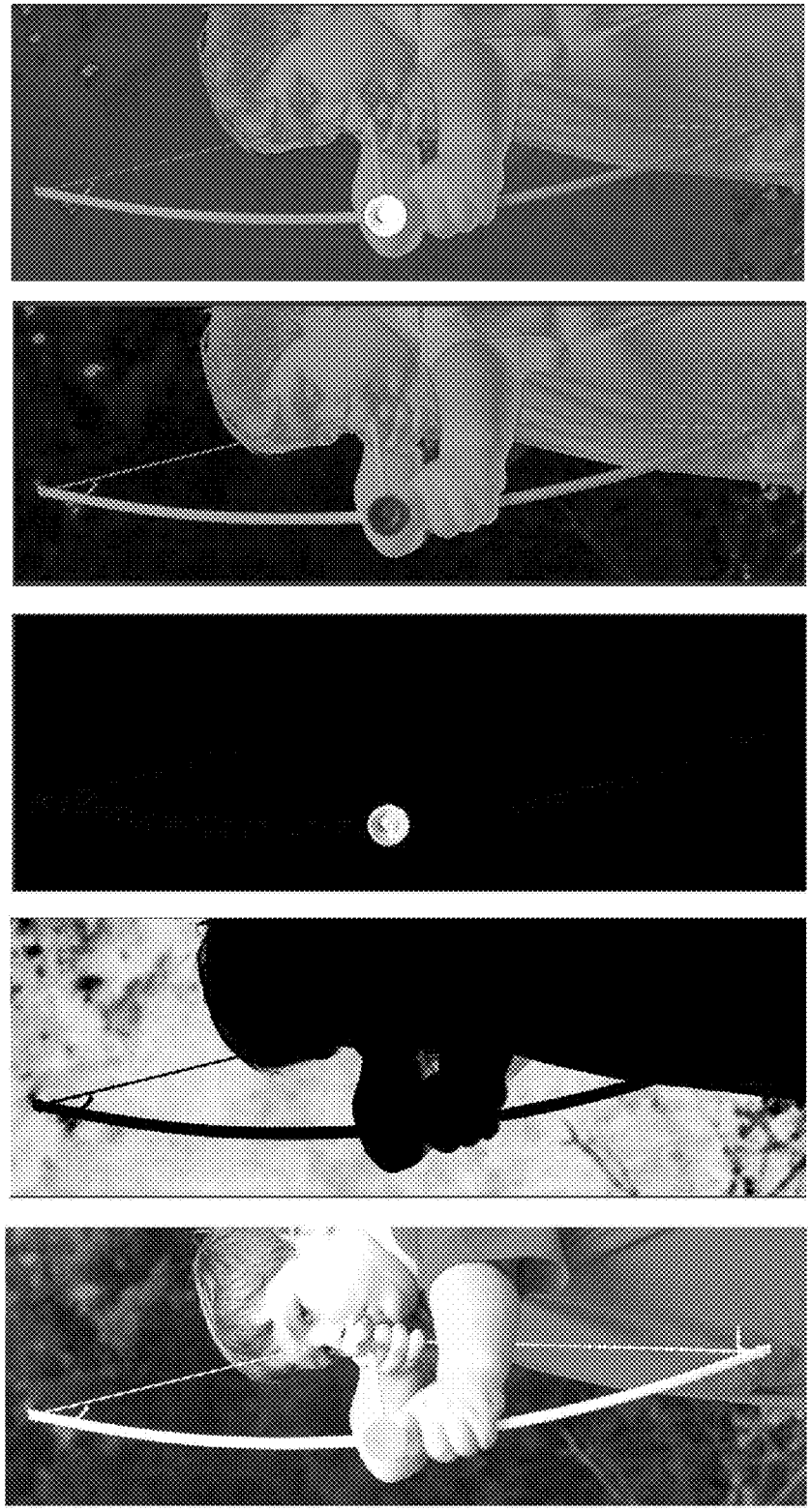

SYSTEM AND PROCESS FOR TRANSFORMING TWO-DIMENSIONAL IMAGES INTO THREE-DIMENSIONAL IMAGES

CROSS-REFERENCES TO RELATED APPLICATIONS

This application also claims priority from U.S. Provisional Application No. 61/239,049, filed Sep. 1, 2009, which is incorporated herein by reference in its entirety.

FIELD OF THE INVENTION

The field of the invention is generally related to three-dimensional film post-production processes. In particular, the invention relates to a system and process for converting two-dimensional images into three-dimensional images.

BACKGROUND

In human stereo vision, each eye captures a slightly different view of the scene being observed. This difference, or disparity, is due to the baseline distance between the left and right eye of the viewing subject, which results in a different viewing angle and a slightly different image of the scene captured by each eye. When these images are combined by the human visual system, these disparities (along with several other visual cues) allow the observer to gain a strong sense of depth in the observed scene.

Stereo image pairs (created either digitally, through animation or computer generated imagery (CGI), or by traditional photography) exploit the ability of the human brain to combine slightly different images resulting in perception of depth. In order to mimic this effect, each stereo image pair consists of a left eye image and a right eye image. Each complimentary image differs in the same manner as the image captured by a human left and right eye would when viewing the same scene. By presenting the left eye image only to the left eye of a viewer, and the right eye image only to the right eye, the viewer's visual system will combine the images in a similar manner as though the viewer were presented with the scene itself. The result is a similar perception of depth.

Presenting the appropriate images to the left and right eye requires the use of a stereo apparatus, of which there are a number of variations on the setup. For viewing a film sequence of stereo images, however, a common setup includes a pair of left and right digital projectors each projecting the left and right eye image respectively of the stereo pair on to the same film screen space. Each projector has a lens which polarizes the light leaving the projector in a different manner. The viewer wears a pair of 3D eyeglasses, the viewing lenses of which have a special property. The left-eye viewing lens screens out light of the type of polarization being projected by the right camera, and vice versa. As a result, the left eye sees only the image being projected by the left eye projector, and the right eye sees only the image being projected by the right eye projector. The viewer's brain combines the images as mentioned above, and the stereo perception of depth is achieved. The projectors can be placed side by side, but are often stacked on top of one another in a fashion that minimizes the distance between the projection sources.

An alternative setup substitutes the pair of digital projectors with a single projector which alternately displays left eye/right eye images above some minimum display rate. The projector has a synchronized lens which switches polarization in time with the alternate display of the images to keep the left eye and right eye images correctly polarized. Again, a pair of appropriately polarized 3D eyeglasses are worn by the viewer to ensure that each eye only sees the image intended for that eye. A similar approach is employed by the high speed synchronized left- and right-eye imaging found in modern 3D-capable digital televisions.

Although these setups may be suitable for the viewing of stereo image pairs, there are a number of variations on the apparatus that can achieve a stereo depth effect. Essentially, any apparatus that allows for the presentation of two corresponding different images, one to each eye, can potentially be used to achieve the stereo depth effect.

Capturing a stereo pair of images with the aim of reproducing the depth effect as described above is relatively simple. For example, a stereo camera rig can be set up with a pair of synchronized cameras that capture a scene simultaneously. The cameras are separated by a sufficient baseline to account for the distance between the eyes of an average human viewer. In this manner, the captured images will effectively mimic what each individual eye of the viewer would have seen if they were viewing the scene themselves.

There exists, however, a substantial library of film (or "image streams") in the industry that were captured by only a single camera. Thus, these image streams only contain two-dimensional information. Various methods have been attempted to convert these 2D image streams into three-dimensional image streams, most providing reasonable results only after expending significant effort and cost.

Creating a sequence of complimentary stereo image pairs from a given sequence of one or more images, each captured with only a single camera, to induce the perception of three dimensional depth, has been a difficult problem. The pair must be constructed carefully to mimic the differences a human visual system would expect to observe in a stereo pair as described above, or the perception of depth will fail and the viewer will see an unpleasant jumble of scene elements. Not only must each image pair be correctly organized and/or reconstructed, but the sequence of image pairs must be organized and/or reconstructed consistently so that elements in the scene do not shift unnaturally in depth over the course of the sequence.

The present industry accepted approach to creating a sequence of stereo pairs from a sequence of single 2D images involves three very costly steps.

First, the image sequence of one of the images in the stereo pair is rotoscoped. Rotoscoping is a substantially manual and complicated process performed on image sequences involving outlining every element in a frame and extending that over a filmed sequence, one frame at a time. This requires a human operator to manually process almost every frame of a sequence, tracing out the scene elements so that they can be selected and separately shifted in the image. Common elements in film can take hours and days to manually rotoscope just a few seconds of a completed shot. Despite being a complex task, rotoscoping results in a rather limited, low-quality selection. For example, in order to separately select a subset of an actor's face so that each element can be modified separately, in addition to outlining the actor, each element would have to be outlined or traced frame by frame for the duration of the scene. Selecting elements at this detail is known as a form of segmentation. Segmentation refers to the selection or sub-selections, or parts, of an image (for example, the individual pieces of an actor's face) and keeping those parts separate for creative and technical control. In a more complex scene, with high-speed action and various levels of detail and crossing objects, rotoscoping as a segmentation tool, becomes extremely inefficient due to the increase in complexity of the scene itself. Rotoscoping thus becomes a very cost-intensive process, and one of the reasons converting 2D to 3D has been so expensive and time consuming.

Close-up shots of actors are very common and present numerous problems for artists using rotoscoping and/or other outlining techniques to create a proper separation of the actor from even a simple background. For example, creating a conversion that successfully includes the fine hairs and other details on an actor's head in a close-up camera shot which appear frequently in feature films could take between 1-3 days by a competent artist depending on the segmentation detail required. The technique becomes substantially more difficult in a crowd scene.

Patents have issued for computer enhanced rotoscoping processes for use in converting 2D images into 3D images, such as that described by U.S. Pat. No. 6,208,348 to Kaye, incorporated herein by reference; however, these technologies have done little more than speed up the process of selecting and duplicating objects within the original image into a left-right stereo pair. Each object must still be manually chosen by an outlining mechanism, usually by an operator drawing around the object using a mouse or other computer selection device, and the objects then must be repositioned with object rendering tools in a complementary image and precisely aligned over the entire image sequence in order to create a coherent stereoscopic effect.

Second, for life-like 3D rendering of 2D film that approaches the quality of CGI or film shot by a true stereo 3D camera, the 3D geometry of the scene represented by the image must be virtually reconstructed. The geometry creation required for such a reconstruction is difficult to automate effectively, and each rotoscoped element must be assigned to its respective geometry in the scene. The geometry must then also be animated over the sequence to follow scene elements and produce the desired depth effect. The 2D to 3D conversion of *Harry Potter and the Half-Blood Prince* (2009) involved a similar technique. Each object in the original 2D scene was analyzed and selected by a graphic artist, 3D object models or renditions created from their 2D counterparts, and the scene completely or partially recreated in 3D to generate depth information appropriate to create a stereoscopic image. IMAX Corporation's computer system processed the information to generate the correct offset images in the complimentary images of the stereo pair. See Lewis Wallace, *Video: How IMAX Wizards Convert Harry Potter to 3-D*, WIRED. COM, Aug. 6, 2009 (last visited Aug. 26, 2010), http://www.wired.com/underwire/2009/08/video-how-imax-wizards-convert-harry-potter-to-3-d. Significant drawbacks of recreating entire scenes in 3D include requiring a perfect camera track and solution for every shot, countless manual labor hours and/or artist oversight to create complex geometry to perfectly match and animate within the environment, and enormous processing power and/or time to render those elements together. Similarly, the approach of U.S. Pat. No. 6,208,348 to Kaye applies the curvature of simple shapes such as cylinders and spheres (as shown by FIGS. 12E, F, G, H of that patent) to the image to create a semblance of dimensionality, which is extremely limiting, and results in images that are not truly life-like.

Third, the elements of the scene are then shifted or moved horizontally and placed in the complimentary image of the stereo pair. Shifting of scene elements is necessary in order to produce the disparities between the first and second eye that the human visual system would expect to observe in a stereo image pair. However, in captured images, the process of shifting 2D elements reveals 'holes' that were previously occluded by the shifted elements. Essentially, no visual information exists due to the movement of the occlusions. For example, in a digital image of a person standing in front of a store, the image of the person hides, or occludes, a portion of the store in the background. If this person is digitally shifted, no image information will remain where the person was originally positioned in the image. These image areas left blank by the process of shifting elements must be refilled. Whether the scene was reconstructed and re-imaged, or whether the rotoscoped elements were shifted manually in the image to produce the disparities required for depth perception, one or both images in the pair will have missing information. That is, occluding objects in the scene, once shifted in the reconstruction or otherwise, will reveal portions of the scene for which there is no information contained in the image. This missing information is very difficult to automatically create in general, and requires a human operator to manually fill in this information on virtually every frame. U.S. Pat. No. 6,208,348 to Kaye describes a method of pixel duplication to fill the holes by repeating an equivalent number of pixels horizontally in the opposite direction of the required directional placement. However, this "pixel repeat" results in a very unrealistic image, and thus manual painting of those holes frame by frame is usually required for an optimal result.

Over the years, as described above, there has been a collective effort by those in the visual effects industry engaged in 2D to 3D conversion to create new visual material for the occlusions or blanks. How to create new occluded visual information was a primary topic of discussion at industry trade shows. It was thought that creating the occluded new visual information was the logical thing to do because it best simulates the experience with binocular vision.

What has been needed, and heretofore unavailable, is a system and process that avoids the need for the time and cost intensive practice of rotoscoping or manually processing each frame of a sequence by tracing out the scene elements, building or reconstructing 3D geometry, 3D scene tracking, as well as image reconstruction and mapping and high-quality rendering of image information, all while, at the same time, providing a reliable system and process for rapidly transforming a 2D monocular sequence into a sequence of stereo image pairs, reducing human interaction, and improving fidelity and detail.

SUMMARY OF THE INVENTION

Contrary to industry practice, the inventor of the system and process described herein has discovered that a far easier approach to transforming 2D images into 3D images is to hide image information rather than create it, and then combine that with a superior method of selecting and/or segmenting images. The inventor discovered that hiding certain image information, for instance, by warping or distorting portions of the image to shrink or increase portions of the image, actually triggered the same perceived stereoscopic effect as generating new information. This process of hiding image information was also found to be vastly faster than the process of duplication and/or re-imaging. When combined with a process of selecting and segmenting an image using the image's own intrinsic qualities, rather than by rotoscoping, a superior and much more realistic final 3D image is created with vastly improved fidelity and detail, and the speed of the process allows for more iterations and refinement.

In a general aspect, the proposed approach avoids the problems of the prior art mentioned above at a significant reduction to post-production time and cost. First, it avoids the rotoscoping step by using a weighted image selection based upon a variety of visual image properties. This requires little interaction from a human operator as compared to rotoscoping. Second, it avoids any costly virtual reconstruction step by vector-based remapping of image elements by compressing or expanding portions of the image to provide the perception of shifting image elements to achieve the disparities required for stereo depth perception. There is no need to recreate the image by creating 3D geometry or recreating objects. This is substantially different than other methods of 2D to 3D conversion, and removes the need for rotoscoping, 3D scene tracking, geometry building, image reconstruction and mapping and high-quality rendering of those systems and methods. Third, it avoids any costly manual refilling such as pixel repeat or frame by frame painting by intelligently applying a series of image re-mappings using weighted image masks in a soft fashion (for example, blending the remapping with the original material so the distortion does not have any hard edges). The result of these operations does not cause occluding objects to reveal any absent information which would need to be filled. In situations where an occlusion would otherwise reveal such absent information, the weighted image re-mappings automatically interpolate appropriate substitute information and produce a stereo image pair which effectively induces a strong perception of stereo depth when viewed with the appropriate stereo apparatus.

In one aspect, the invention includes a process for creating a perception of a three-dimensional image from a two-dimensional image, including displacing a portion of a working image by distortion of the working image to create a modified working image, a magnitude of the displacement being relative to a perceived depth of the portion, the distortion operating to interpolate image information over a range of the displacement, and replacing a selected image in a stereo pair of images with the modified working image. In some aspects, the process further includes displaying on a video display the modified working image as part of the pair of stereo images. The perception of a three-dimensional image is created when the modified working image is viewed as part of the pair of stereo images through a stereoscopic viewing device.

In further aspects, the process includes creating an image mask associated with characteristics of the working image and associated with at least a portion of the working image, and assigning a depth value to each pixel location of the working image that is associated with the image mask, the depth value being chosen from a specified range of values, wherein the magnitude of the displacement being relative to a perceived depth of the portion includes a maximum magnitude of displacement being assigned to each pixel location having a first selected depth value and a minimum magnitude of displacement being assigned to each pixel location having a second selected depth value and an intermediate magnitude of displacement being assigned to a pixel location having a third selected depth value, the third selected depth value selected from a range between the first and second depth values. In accordance with this aspect, the process may also include creating a boundary on at least one part of the image mask so as to preclude assigning the depth values to non-selected pixel locations outside the boundary. The process may also include assigning a depth value to each pixel location of the working image includes assigning the depth value to each pixel location of the image mask and then applying the image mask to the working image to assign each depth value to a corresponding pixel location in the working image to displace the portion of the working image.

In yet further aspects, creating an image mask associated with characteristics of the working image includes selecting an image characteristic from a group consisting of hue, luminance, saturation, and color, and generating an image representation of a weighted distribution of the image characteristic in the working image, wherein the depth values are assigned to each pixel location in accordance with the weighted distribution. The process may also include comparing a portion of an image feature present in the working image with a portion of the image mask and a selected range of depth values, and changing the depth value at a selected pixel of the image mask based on a location of the selected pixel relative to the image feature. In accordance with these further aspects, the process may include applying the image mask to a second image to assign each depth value to a corresponding pixel location in the second image, displacing by distortion of the second image a portion of the second image in a direction opposite the displacement of the working image, and replacing a selected image in a stereo pair of images with the second image.

In some aspects, the process includes providing a second image associated with the working image, displacing a portion of the second image by a distortion of the second image to create a modified second image, a magnitude of the displacement of the second image being relative to a perceived depth of the portion of the second image, the distortion of the second image operating to interpolate image information over a range of the displacement of the second image, and replacing the second image in a stereo pair of images with the modified second image. In accordance with some of these aspects, the perception of the three-dimensional image is created when the modified working image and the modified second image are viewed as a pair of stereo images through a stereoscopic viewing device. The displacement of the second image may be in a direction opposite the displacement of the working image. Further, the magnitude of the displacement of the second image may be equal, or substantially equal, to the magnitude of the displacement of the working image.

In a further aspect, the invention includes a system for creating a perception of a three-dimensional image from a two-dimensional digitized image, including a video monitor configured to display a stereo pair of images in response to a video signal, an input device configured to generate input signals, and configured to select a working image from a group of images, and configured to select characteristics of the working image, a control configured to generate control signals, and configured to assign a value to a characteristic selected by the input device. The processor is in operable communication with the monitor, the input device and the control, the processor configured to displace a portion of the working image by distortion of the working image to create a modified working image, a magnitude of the displacement being relative to a value received by the control, the distortion operating to interpolate image information over a range of the displacement, the processor, in response to a first input signal, further configured to replace a selected image in a stereo pair of images with the modified working image. The video monitor, in response to a second input signal, displays the modified working image as part of the stereo pair of images.

In accordance with the above aspect, the processor may be further configured to create an image mask associated with characteristics of the working image and associated with at least a portion of the working image in response to a second input signal, and to assign a depth value to each pixel location of the working image that is associated with the image mask, the depth value being chosen from a specified range of values, wherein the magnitude of the displacement being relative to a value received by the control includes a control value received by the control multiplied by a scaling factor determinable at each pixel location according to the depth value assigned to each pixel location. In some aspects, the processor is further configured to, in response to a second input signal, apply the image mask to a second image to assign each depth value to a corresponding pixel location in the second image, the processor further configured to displace in a direction opposite the displacement of the working image a portion of the second image by distortion of the second image, and the processor further configured to replace a selected image in a stereo pair of images with the second image.

In further aspects, the processor may be further configured, on receiving a command from the input device, to distort at least part of a selected image from the stereo pair of images by applying a distortion to the selected image. Similarly, the processor may be configured, on receiving a command from the input device, to remove a distortion from at least part of a selected image from the stereo pair of images by applying a distortion to the selected image. The processor may also be configured, on receiving first commands from the input device, to select a first and second portion of the working image as candidates for displacement, and to assign the first and second portions to first and second controls, wherein the first control is operational to displace the first portion and the second control is operational to displace the second portion.

In some aspects, the system further includes a stereoscopic viewing device, and an image storage for storing an image stream of multiple working images, wherein the processor is configured to, in response to a second input signal, receive the image stream from the storage and display the image stream on the video monitor to generate the perception of a three-dimensional motion picture when viewed through the stereoscopic viewing device.

In a further aspect, the invention includes a process for generating a three-dimensional media from a two-dimensional media, including creating an image mask of pixel locations associated with characteristics of a working image and associated with at least a portion of the working image, and assigning a depth value to each pixel location of the image mask, applying the image mask to the working image to assign each of the depth values to a corresponding pixel location in the working image, assigning a maximum magnitude of displacement to a pixel location having a first selected depth value, assigning a minimum magnitude of displacement to a pixel location having a second selected depth value, assigning an intermediate magnitude of displacement being to a pixel location having a third selected depth value, the third selected depth value selected from a range between the first and second depth values, displacing a portion of a working image by distortion of the working image in accordance with the assigned depth values and maximum, minimum, and intermediate magnitudes to create a modified working image, the distortion operating to interpolate image information over a range of the displacement, replacing a selected image in a stereo pair of images with the modified working image, and displaying on a video display the modified working image as part of the pair of stereo images.

In a yet further aspect, the invention includes a process for generating a three-dimensional media from a two-dimensional media, including providing a working image selected from a stereo image pair of images consisting of a left eye image and a right eye image, assigning a depth selection value to each pixel location of the working image in a group of pixels associated with a portion of the working image, the depth selection value being chosen from a specified range of values, displacing each pixel at each pixel location having a depth selection value in accordance with a vector, a magnitude of the vector being determined by the depth selection value, to create a modified working image, and replacing the working image with the modified working image.

In one aspect, the invention includes a method for transforming a stream of two-dimensional images so as to allow a viewer to perceive the transformed stream of images as three-dimensional. In this aspect, the method includes a) producing a pair of images from a single two-dimensional image, and b) adjusting various elements of at least one of the pair of images to provide a disparity sufficient to provide a perception of depth when the pair of images are subsequently viewed. Steps a) and b) may also be performed in a sequence of images to provide a stream of images that when viewed are perceived to contain depth information sufficient to provide a three-dimensional effect.

In another aspect, the invention includes a method for creating a perception of a three-dimensional image from a two-dimensional image, the method including providing a working image selected from a stereo image pair of images consisting of a left eye image and a right eye image, creating a depth selection mask associated with a selected characteristic of the working image and associated with at least a portion of the working image, assigning a depth selection value to each pixel location of the working image that is associated with the depth selection mask, the depth selection value being chosen from a specified range of values, displacing each pixel at each pixel location having a depth selection value in accordance with a vector, a magnitude of the vector being determined by the depth selection value, to create a modified working image, and replacing the working image with the modified working image.

In one aspect, the method may further include distorting at least part of a selected image from the stereo pair by applying a radial image distortion to the selected image. In another aspect, the method may include removing radial distortion from at least part of a selected image from the stereo pair by applying a radial image distortion to the selected image. In yet another aspect the method may include selecting the selected characteristic from a group consisting of luminance, saturation, and color. In a further aspect, the depth selection mask is a pixel-wise appearance model, and the method includes comparing a portion of an image feature present at each pixel location with the depth selection value at each pixel at each pixel location and a selected range of depth selection values, and changing the depth selection value at a selected pixel based on a location of the selected pixel relative to the image feature. In yet a further aspect, the method may include creating a boundary on at least one part of the depth selection mask so as to preclude assigning the depth selection value at non-selected pixel locations outside the boundary. An edge of a perceived object in the two-dimensional digitized image may be selected as a proximate location for the boundary.

In one aspect, the method may also include providing a second image selected from a stereo image pair of images consisting of a left eye image and a right eye image, the working image and second image being selected from a sequence of images, associating the depth selection mask with the second image, and displacing the depth selection mask in accordance with a displacement of the selected characteristic from the working image to the second image and displacement of the portion of the working image occurring in the second image, wherein a second set of depth selection values are automatically assigned to the second image in accordance with the displaced depth selection mask, and wherein each pixel of the second image associated with the depth selection mask is automatically displaced in accordance with the displaced depth selection mask to create a modified second image, and wherein the perception of a moving three-dimensional image is created when the modified working image and the modified second image are viewed in sequence as part of a sequence of stereo image pairs. In some aspects, the depth selection mask is omitted and the depth selection value is assigned to each pixel location of the working image in a group of pixels associated with a portion of the working image.

In a further aspect, the invention includes a system for creating a perception of a three-dimensional image from a two-dimensional digitized image, including a video monitor adapted to generate visual displays in response to a video signal, an input device for selecting a working image selected from a stereo image pair of images consisting of a left eye image and a right eye image and for selecting a characteristic of the working image, the processor configured to create a depth selection mask associated with the selected characteristic of the working image and associated with at least a portion of the working image, the processor being configured to assign a depth selection value to each pixel location of the working image that is associated with the depth selection mask, the depth selection value being chosen from a specified range of values, the processor being further configured to displace each pixel at each pixel location having a depth selection value in accordance with a vector, a magnitude of the vector being determined by the depth selection value and a signal received from the input device, to create a modified working image, the processor being further configured to replace the working image with the modified working image in the stereo image pair, and the processor being further configured to display the stereo image pair, including the modified working image.

In another aspect, the system includes the processor being further configured, on receiving a command from the input device, to distort at least part of a selected image from the stereo pair by applying a radial image distortion to the selected image. In another aspect the system includes the processor being further configured, on receiving a command from the input device, to remove a radial distortion from at least part of a selected image from the stereo pair by applying a radial image distortion to the selected image. The input device may include a keyboard and a mouse.

In yet another aspect, the depth selection mask is a pixel-wise appearance model, and the system includes the processor being further configured, on receiving a command from the input device, to compare a portion of an image feature present at each pixel location with the depth selection value at each pixel location and with a selected range of depth selection values, and to change the depth selection value at a selected pixel based on a location of the selected pixel relative to the image feature. In another aspect, the system includes the processor being further configured, on receiving a command from the input device, to create a boundary on at least one part of the depth selection mask so as to preclude assigning the depth selection value at non-selected pixel locations outside the boundary. In yet another aspect the system includes the processor being further configured, on receiving a command from the input device, to select an edge of a perceived object in the two-dimensional digitized image as a proximate location for the boundary.

In further aspects, the system may also include the processor being further configured, on receiving a command from the input device, to provide a second image selected from a stereo image pair of images consisting of a left eye image and a right eye image, the working image and second image being selected from a sequence of images, to associate the depth selection mask with the second image, and to displace the depth selection mask in accordance with a displacement of the selected characteristic from the working image to the second image and displacement of the portion of the working image occurring in the second image, wherein a second set of depth selection values are automatically assigned to the second image in accordance with the displaced depth selection mask, and wherein each pixel of the second image associated with the depth selection mask is automatically displaced in accordance with the displaced depth selection mask to create a modified second image, the processor being further configured to automatically displace each pixel of the second image associated with the depth selection mask in accordance with the displaced depth selection mask to create a modified second image, and the processor being further configured to display a sequence of stereo image pairs, including the modified working image and the modified second image.

Other features and advantages of the invention will become apparent from the following detailed description, taken in conjunction with the accompanying drawings, which illustrate, by way of example, the features of the invention.

BRIEF DESCRIPTION OF THE DRAWINGS

A detailed description of the embodiment of the invention will be made with reference to the accompanying drawings:

FIGS. 5A through 5C depict a stereo pair of images created from an original image in accordance with an embodiment of the present invention.

FIGS. 9A through 9D depict an exemplary illustration of a transformation process performed on an image in accordance with an embodiment of the present invention.

FIG. 13 is a depiction of an exemplary process for creating and defining a depth selection mask in accordance with an embodiment of the present invention.

DETAILED DESCRIPTION OF THE PREFERRED EMBODIMENTS

Figure 1:
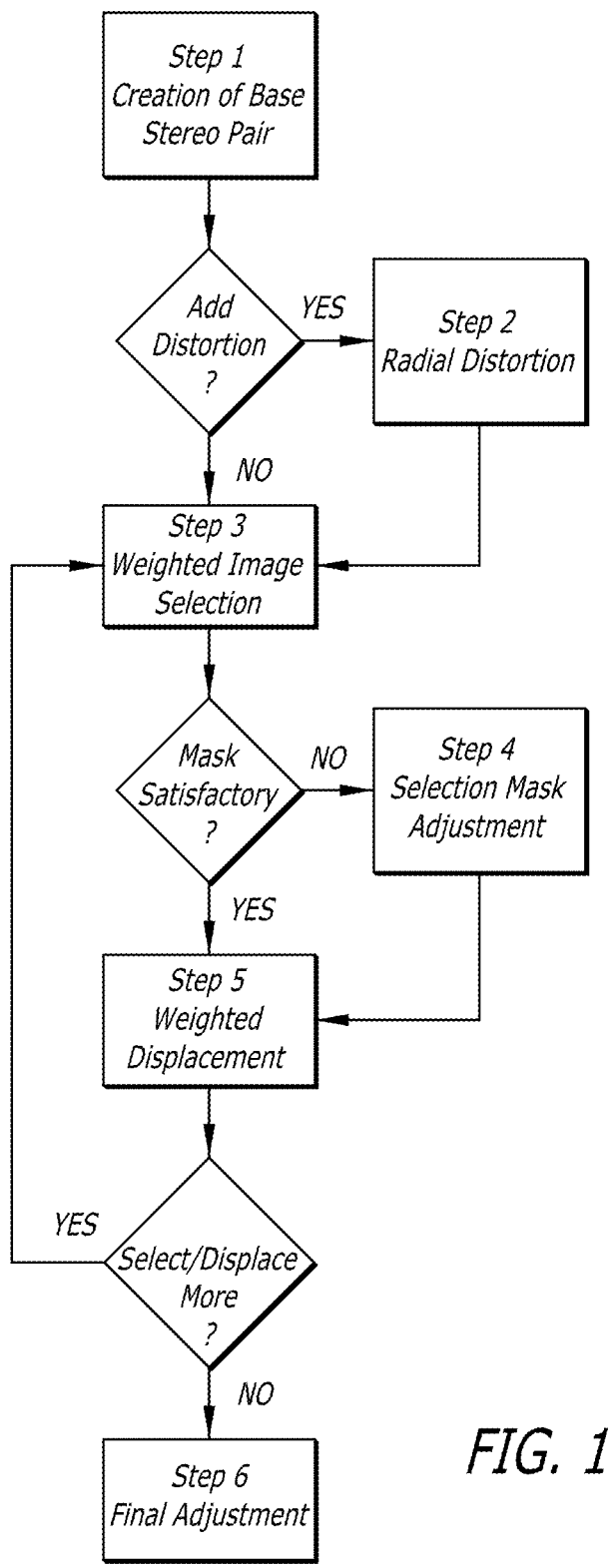
FIG. 1 is a flowchart including steps for transforming a two-dimensional (2D) image into a three-dimensional (3D) image in a stereo pair of images in accordance with embodiments of the present invention.

In order to describe the preferred embodiments of the present invention, a dictionary of terms is helpful to understand certain terms used. This dictionary of terms is directed to a post-production process for manipulating images, however, it is not limited to just a post-production process, but is applicable to processes for manipulating images. The terms used are defined as follows:

Animated Parameters—Parameters which change as governed by an arbitrary function over time.

Artist—A graphic artist, an editor, or a user who and/or performs the process described herein to transform a 2D image or sequence of images into a 3D image or sequence of images. The term "artist" is further defined as an operator of the system who may be taking direction from another graphic artist, client, or other person to perform the transformation process. For the purpose of this disclosure the terms "artist" and "operator" will be used interchangeably Disparity—The difference in position of a fixed point in a scene when imaged from two distinct view points which are not at the same location and orientation.

Depth selection mask—A set of values in a given range, for example, the range [0.0, 1.0], which is assigned distinctly to each pixel location in a portion of an image by the artist-assisted software to determine how the transformation/remapping will be applied in order to achieve an appropriate depth effect.

Image—The discretized projection of a continuous 3D scene onto a 2D imaging plane. The image takes the form of a 2D grid of data, representing samples taken at integral coordinate locations of the continuous projected 3D data on the 2D image plane.

Image mask—A weighted value mapping of a combination of elements, segments, sub-segments, selections, and/or sub-selections, chosen according to selected characteristics inherent in the image, which, in some embodiments, may be applied to the image to manipulate the image as a whole to create a depth selection mask. In other embodiments, depth selection mask is a form of image mask, and thus the terms can be used interchangeably.

Image Transformation/Remapping—A mapping from one image to another. More specifically, a function such as $T(p)=p'$ where $T: \mathbb{R}^2 \to \mathbb{R}^2$ and p is an (x,y) coordinate in the original image, while p' is an (x,y) coordinate in the resulting image. Alternatively, T can be from $\mathbb{R}^3 \to \mathbb{R}^3$ where homogeneous coordinates are used for mathematical convenience. It is often the case that applying the inverse transformation, $p=T^1 p'$, can be more convenient in reconstructing a new image. It can be assumed that wherever a transformation or remapping is referred to, the least destructive approach will be taken by the artist, in order to reduce any artifacts to the original source material.

Monocular Image—An image taken with a single camera.

Monocular Image Sequence—A sequence of monocular images taken with the same camera over time.

Noise—The random variation of brightness or color information in images.

Nonlinear Transformation/Remapping—A mapping between two vector spaces $T: V \to W$ for which one of the following does not hold. $T(v^1+v^2)=T(v^1)+T(v^2)$, or $T(av_1)=aT(v^1)$.

Occlusions—Elements which hide or occlude other elements or portions of a complete background scene, or other visible elements. Moving an object reveals a hole, which was originally occluded.

Pipeline—A set of data processing elements connected in series, so that the output of one element is the input of the next one.

Pixel—A picture (image) element referring to a single sample stored at a given (x,y) coordinate in an image, which can include information about any number of image features. For example, a pixel at any given (x,y) location in an image will often include red, green, blue and alpha channel information for that sample location.

Pixel-wise appearance model—A selection of pixels representing a visual element of an image, the pixels being chosen according to given characteristics inherent in the image and each assigned a value as a function of the chosen characteristics.

Polarization—The property of waves (in this context, light waves) that describes the orientation of their oscillations.

Rotoscope—The manual and heavily human supervised process of separating samples in an image into distinct sets. This is done by outlining distinct elements by drawing or manipulating splines in a frame by frame manner. The process of rotoscoping is further defined in the Background section above.

Segmentation—The process of selecting portions of an image based on certain visual characteristics, for example, color, hue, luminance, saturation, gamma, contrast, brightness, lightness value, lighting angle, and other values and/or characteristics known in the art.

Segment—A pixel-wise selection of a portion or portions of an image made by the process of segmentation. Contrary to a selection, a segment is similar to a topographical representation of the chosen visual characteristics, not just any particular bounded area. However, the characteristics may be chosen such that they are defined by a bounded area Selection—Outline of an object in a scene or bounded area, usually the result of a form of rotoscoping process.

Sub-selection—A portion of a selection.

Element—A portion of the image corresponding to one or more segments that have a common theme (for example, the leaves on a tree) and not selected according to any mathematical value. Alternatively, the term element can be used to designate any individual segment, selection, and/or subsection, or combination thereof.

Stereo Apparatus—One of any number of equipment set-ups intended to present differing images to the left and right eye of a human observer.

Stereo Depth—The sensation of depth perceived by the human visual system when presented with two slightly different projections of the world onto the retina of the two eyes.

Stereo Image (or "stereoscopic image")—A pair of images taken at the same instant with a pair of synchronized cameras, with a specific relative position and orientation. Typically, the cameras used in taking a stereo image pair are separated by some baseline horizontal distance, and angled towards each other so that their viewing directions converge at some fixed point visible in both cameras.

Stereo Image Sequence—A sequence of Stereo Image Pairs taken with the same cameras over time.

Vector Field—A mathematical construction which associates a multidimensional vector to each point in a Euclidean space. For example, an m dimensional vector field V of a Euclidean space of dimension n, is the mapping $V: \mathbb{R}^n \to \mathbb{R}^m$.

Virtual Reconstruction—The creation of a virtual 3D model of a scene from one or more images captured of the scene, complete with geometry defined by any number of possible mathematical models.

Weighted Selection—A selection which is based upon a real value rather than a binary value. For example, an image element (a pixel in this context) has more than the two simple options of being selected, or unselected. Instead, an element receives a real valued weight indicating the strength of the selection. In a depth selection mask, each pixel may be represented, for example, by a different color, luminosity, or shade of gray.

Working image—An image that is currently subject to modification by the system and process described herein to create the perception of a three-dimensional image when the working image is modified and viewed as part of a stereo image pair.

The preceding terms are used for convenience of exemplary discussion only and are not to be understood as limiting the invention.

The Transformation Process

The inventor has discovered that image "shifting" results from the distorting of an element in relation to the remaining portions of the working image, and relative to the complimentary non-working image. The element, or portions thereof, processed by the disclosed steps may ultimately be stretched or compressed to achieve the desired result. Optimally, one-half the distortion (and/or compression) will be observed for each RE or LE image; for example, an element brought to the foreground (or pulled forward) may have its representation in the RE image stretched but its representation in the LE image compressed by an equal amount. Where an element is distorted, image information proximal to the element may become compressed and thus hidden. The hidden image information in one image remains viewable to the complimentary image, and vice versa. Such effect has been discovered by the inventor to be directly attributable to triggering a stereoscopic effect in the viewer by altering the horizontal parallax of an object relative to the human right and left eyes when viewed through polarized lenses. Additionally, as discussed by BERNARD MENDIBURU, 3D MOVIE MAKING: S IEREOSCOPIC DIGITAL CINEMA FROM SCRIPT TO SCREEN 17-18 (Focal Press 2009), incorporated herein by reference, this hiding of elements in one eye such that the other eye sees more visual information in the other, appears as occlusion revelations to the viewer which reinforce the stereo effect.

A sequence of stereo image pairs is generated given an original digitized monocular image sequence. This is accomplished by first taking each image of the original sequence and applying an initial image transformation and nonlinear image remapping. This creates a pair of complimentary images which account for the initial baseline disparity in stereo imaging systems. One or each of the complimentary images then undergoes the application of a selection and remapping process to independently alter portions of the image. The remapping shifts the selected image elements in a manner which produces a stereo depth effect when the images are viewed through the appropriate stereo apparatus. The remapping process may then be repeated a number of times for each image or sequence of images.

The process consists of a number of distinct processing steps which are applied to each image in the original monocular sequence. The steps are outlined as follows:

1. Creation of Base Stereo Pair—An initial image transformation to produce a base pair of complimentary stereo images.

2. Radial Distortion—An optional nonlinear remapping of both images from the stereo pair produced in the previous step to introduce a weak depth effect.

3. Weighted Image Selection—A weighted selection of one of the images in the stereo pair resulting in an image mask, indicating an element (or elements) of the image to be shifted.

4. Depth Selection Mask Adjustment—An optional post-processing of the image mask produced in Step 3 to remove any undesirable artifacts or to otherwise improve the quality of the selection mask.

5. Weighted Displacement—An application of the mask from the previous step to a remapping of the image used for selection in the Weighted Image Selection step, specified by an arbitrary vector field.

6. Final Adjustment—A final transformation/remapping/cropping of the image pair to reduce artifacts at the image edges resulting from previous steps.

FIG. 1 provides an overview of the above process. The goal of the overall process is to create a stereo pair of images for each image in the original monocular sequence, and to have these stereo pairs result in the perception of depth when presented to the human viewer. In step 1, a base stereo pair of images is created. In some embodiments, following the image pair creation, step 2 is included to add an initial weak depth effect by applying a radial image distortion. The initial pair is then realigned in stereospace (see FIG. 2). As explained below, each image may be brought forward or pushed back to better resemble what the left and right eye views of a stereo rig would have recorded, had one been used to capture a true stereo image pair of the same scene as the original image. This is a creative step which, by using the system disclosed herein, becomes visually intuitive for the artist. For example, as will be described in further detail herein, an entire scene can be pushed away from the viewer's perspective in depth, then the relevant elements brought forward towards the viewer or vice versa. Step 3 involves a refinement by the use of an image mask to select individual element(s) from the image using a weighted selection of the image's own intrinsic characteristics. This weighted selection creates a depth selection mask that can be used in Step 5 to shift the image left or right using a process involving a weighted displacement of those pixels selected by the depth selection mask. The purpose of this realignment is to create the kind of disparity that would normally be present in a pair of images actually captured using a stereo camera rig. In some embodiments, Step 4 is used to provide further refinement of the selection of the element(s) to be shifted, as the result of Step 3 may not always be adequate on its own to achieve the desired end result. Similarly, Step 6 provides a final clean-up step to address any problems at image boundaries as a result of the previous steps.

In one embodiment, Steps 1, 2, and 6 are applied once per image in the stereo pair. Steps 3 through 5 can be repeated successively as many times as required per image in order to achieve the desired result in an interactive fashion. The shifted image of the stereo pair produced from step 5 can iteratively be fed through steps 3 through 5 with a different selection or segment and displacement applied in each iteration. Alternatively, the complimentary image to the shifted image of the stereo pair produced by step 5 can also be iteratively fed through steps 3 through 5 with a different selection or segment and displacement. Either image of the stereo pair is a candidate for the selection, segmentation and displacement process, and can be fed through steps 3 through 5 repeatedly as many times as required to achieve the desired stereo depth effect in the resulting stereo image pair.

In some embodiments, only one image of the stereo pair (the "working image") undergoes the selection and remapping of steps 3 through 5. In some embodiments, this image is referred to as the LE (Left-Eye) image. In some embodiments, the other image of the base stereo pair, typically referred to as the RE (Right-Eye) image, remains untouched during these steps. However, in further embodiments, steps 3 through 5 may be applied to either or both images separately in order to create the desired depth effect in the end stereo pair. As previously described, applying the process to both images can be beneficial when trying to achieve a more pronounced stereo depth effect which would otherwise require a more drastic selection/remapping process on a single image of the base stereo pair. Rather than applying a drastic selection and remapping to just the LE image, in some embodiments, it will be advantageous to apply a less drastic selection and remapping process to both images in order to achieve a similarly pronounced stereo depth effect, without creating unwanted abnormalities that could occur in a more drastic selection/remapping process on a single image. Each of the individual steps are described in more detail in the following subsections.

Figure 2:
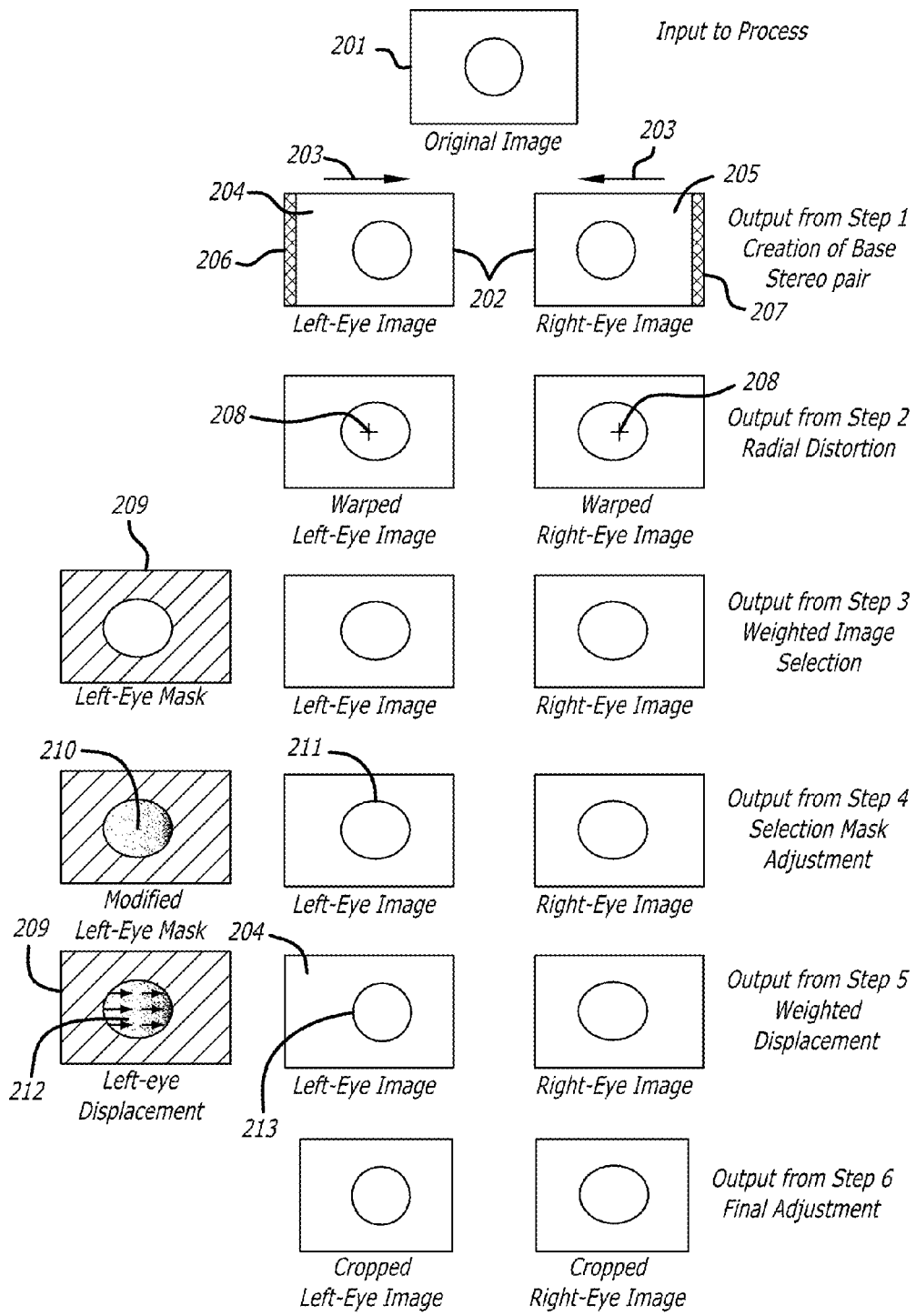
FIG. 2 is a depiction of image data present at each step of an embodiment of the present invention.

FIG. 2 depicts the image data present before and after the execution of each step. Following the images down, an original image 201 is input to the system. In this example, original image 201 is a simple circle on a background. The first step is to create a base stereo pair by duplicating input image 201 of the circle, offsetting the stereo pair of images 202 by shifting one or both in a horizontal direction 203, and label each of the images 202 as a left-eye (LE) image 204 and right-eye (RE) image 205. These images do not have to be shifted left or right, but may be shifted at the preference of the artist. Shifting images 202 has the visual effect of pushing the entire perceived image forward or backwards when viewed with a stereo viewing apparatus. In this example, LE image 204 is pushed to the right, revealing a 'blank' or occlusion hole 206 which is depicted by cross-hatching. The Right-eye image 205 is pushed to the left, revealing a similar occlusion hole 207. When the LE and RE images are combined as a stereoscopic image, the perceived image appears as if the entire scene is floating towards the viewer.

In some embodiments, radial distortion is applied by Step 2. The inventor has found that, in certain instances, the application of radial distortion can provide a sense of realism to the viewer by creating a sense of being surrounded. For example, this effect may be especially pleasing when applied to images portraying scenes such as a jungle or enclosed tunnel. In some embodiments, the radial distortion is applied with a center point 208 offset in the two images so that the center of the stereoscopic image is perceived as being pushed away from the viewer, or the sides of the stereoscopic image is perceived as being pulled towards the viewer as if the entire image was on a curved screen. This has the additional benefit of removing or reducing any blank areas that occurred as a result of step 2. The output of Step 2 is then ready to be selected or segmented by the artist.

Using color and image channels as well as other techniques described herein, the artist segments the image in order to create a depth selection mask 209 from a weighted selection of the working image, which can later be displaced by a weighted displacement of step 5. This can be applied to both the left-Eye and Right-eye images, or either one of the two. In the example illustrated by FIG. 2, depth selection mask 209 is only created for the LE image 204. In Step 4 the artist modifies the selection of Step 3. Any segmentation or selection can be modified using a variety of operators such as additions, subtractions, multiplications or it can, in turn, be further masked using color and image channels to further alter the segmentation based on the artist requirements. In this example, the image is modified so that the resulting depth selection mask has a gradient 210 on it in order to create a depth selection mask which isn't flat and has detail. As described elsewhere herein, this modification can be used to select natural photographic elements such as skin tones and hair to assemble the natural and dimension contours that exist in the image.

In Step 5, depth selection mask 209 is applied to LE image 204 in order to warp or distort LE image 204. Having control of the strength of the application of distortion, the artist can push and/or warp the target shape 211 as much as required to trigger a stereo-optic depth effect and give the object volume and curvature that is similar to a real stereoscopic capture of that element, or that is purposely different than real 3D. LE image 204, including shape 211, is distorted in accordance with a vector displacement 212 (described in detail below) that is in accordance with values assigned to image mask 209, including gradient 210. In the example shown, the displacement is pushing the slightly warped circle 211 back into a circle 213. In some embodiments, Step 6 is employed to crop the image to remove any additional edges that are blank. In some embodiments, the artist can also scale the image slightly in order to achieve a similar result. In some embodiments, the artist reapplies Step 2. It should be noted that any of the steps disclosed can be repeated on a small area of the image or an entire scene. In some embodiments, Steps 3 through 5 are repeated. In some embodiments, the artist does not apply the radial distortion or crops as noted in Steps 2 and 6.

By having the ability to vary the sequence of the steps and/or iteratively repeat certain steps (for example steps 3 through 5) the process becomes nearly real-time and very intuitive. Intuitiveness comes from the speed of the process, and the interactivity of the process allows an operator to get instant feedback. For instance, by varying the displacement of Step 5, the artist can pull an actor or character forward in depth from a background in response to subtle and specific requests from other artists or clients. Questions can be posed in real-time, such as "Can you bring his nose a little farther? I would like to see the bats in the background a little closer to the wall. Please increase the stereo strength of this shot," and so forth. The process of transforming the image becomes similar to looking through the lens of a camera and asking the actor to step forward, or, from off-stage, directing props to be placed at different depths on a stage in a live theater setting. These adjustments and refinements happen visually, and, because a pixel displacement is used, there are no holes or occlusions that have to be filled later, resulting in a final quality image nearly in real-time for everyone viewing the result of the transformation, and continuing feedback can be given verbally to the artist to push elements back, or bring things forward simply by adjusting a slider or other mechanism.

The Software and Hardware Interface for Practicing the Embodiments

Figure 3:
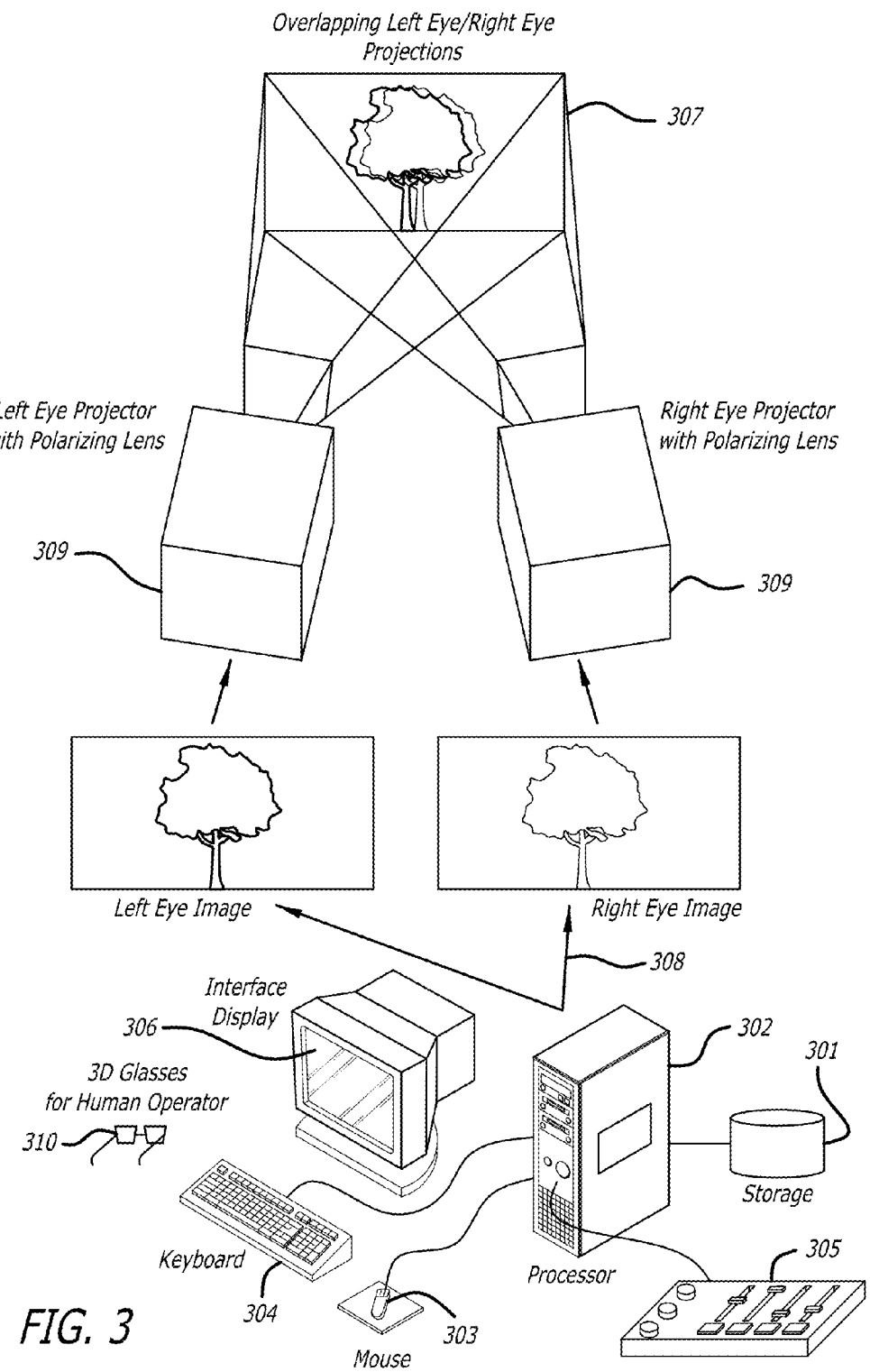
FIG. 3 is a depiction of a system, including an apparatus for viewing a stereo pair of images, for performing steps of transforming a 2D image into a 3D image in a stereo pair in accordance with embodiments of the present invention.

A hardware and software interface is provided for performing the process and various embodiments described herein. The interface includes the hardware and/or software necessary for interactive manipulation of the original monocular sequence into a sequence of stereo image pairs. As shown by FIG. 3, the interface includes a storage device 301 (for example, an external hard drive, flash ram-card, array, tape library or data network) for storing the digitized images of the original monocular sequence as well as the created stereo pairs, and a computer 302, including a processor or processors, for computer controlled implementation of the steps described in the FIGS. 2 and 3, and/or other image processing features of the present invention. The interface also includes a pointing device 303 such as a mouse, and one or more input devices 304, such as a keyboard and/or other controls 305, for manipulating the image data and parameters through software components. Also included is a visual interface 306 and, in some embodiments, a stereoscopic display 307, such as a stereo projection setup augmented by video monitors 308 and/or projectors 309, to allow for viewing of the image data at any step, as well as the interactive adjustment of any of the involved parameters. A stereoscopic viewing device 310, such as, for example, polarized eyeglasses, provide proper rendering of a combined LE and RE image projected on stereoscopic 307 to the human eyes. The combined interface system allows for the presentation/manipulation of either the original, left-eye, right-eye, or left-eye/right-eye stereo image.

The hardware is programmed by the software to enable the artist/user/editor to perform the individual steps of the process described herein to each image in a digitized monocular sequence (in the storage device), to accomplish the transformation of the sequence into a sequence of stereo pairs having a stereo depth effect when the images are viewed through the appropriate stereo apparatus. The software sends commands to the hardware to request and receive data representative of images from storage device 301, through a file system or communication interface of a computer, for example, USB, ATA, SCSI, FireWire, fiber-optic, bus, or other mechanism known in the art. Once the image is received by the system, the artist is presented with a monocular image at desktop display 306, and a corresponding stereoscopic display 307 (for example, on a large-format screen) of the same image (now represented by identical RE and LE images). In some embodiments, the image presented at the desktop display is a working image, generated as a result of the output of step 1. Using selection controls such as pointing device 303 (for example, a mouse or tablet) to direct a cursor or crosshairs on the screen, regions of the working image can be selected, details can be segmented, and all can be manipulated by the artist.

The interface displayed by the software on display 306 provides one or more controls 305, which may include buttons, sliders, and/or dials, for assigning a data value to those regions (or part of those regions) corresponding to a value or visual characteristic which in turn corresponds to areas in the working image that the artist wishes to select and segment. Such values and/or visual characteristics may include color, hue, luminance, saturation, gamma, contrast, brightness, lightness value, lighting angle, and other values and/or characteristics known in the art. It is noteworthy that, contrary to the prior art, an "object" is not necessarily selected or outlined, but, rather, regions of the image, or segments within that image can be targeted for manipulation based on the chosen visual characteristics. This is a faster and more intuitive approach for the artist.

Figure 4:
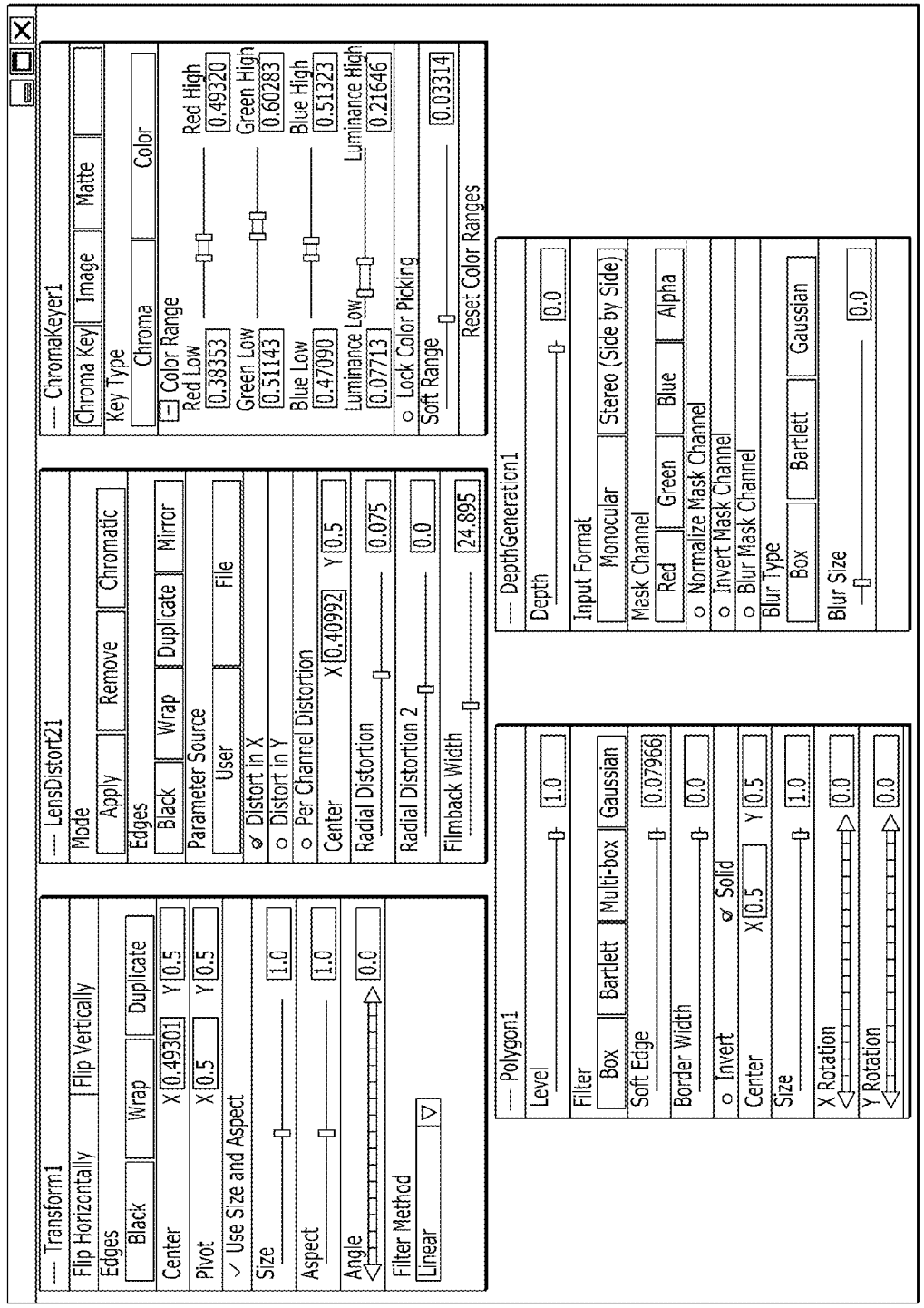
FIG. 4 is a depiction of a display including computer generated virtual controls for use by a software program utilized in accordance with embodiments of the present invention.

Turning to FIG. 4, in some embodiments, one or more of hardware controls 305 are represented by virtual controls rendered by software, for instance, a customized visual dialog having input areas, virtual buttons, dials, and or sliders, that is, interactively displayed to the artist on display 306 and can be manipulated by either input pointing device 303, device 304, or hardware controls 305. The data values are assigned by the virtual and/or hardware controls within the targeted regions to create an image mask (Step 3) based on a weighted selection of the targeted visual characteristics. The weighted selection can be based on the entire image, or, the interface selection control may be operated to limit the designated area of the weighted selection target a portion of an image (for example, an actor's face). The image mask is then applied to the working image to create a depth selection mask for an element of the working image.

It may be desirable to describe a specific feature or features of an image as an element. In such a case, the element may include one or more segments that have a common theme (for example, the leaves on a tree). These elements are defined and used by the artist for the sake of efficiency and intuitive use. In some embodiments, a group of elements, segments, or selections is created for greater flexibility in the manipulation of common features in a scene, for example, with regard to a crowd, the front row or back row independently, or together, with great ease.

In some embodiments, an element, segment, and/or depth selection mask, can be mapped to a specific control, for example, a slider, so that the control can be operated to uniformly alter the values of the Weighted Displacement assigned to that segment or element by the depth selection mask in Steps 3 through 5. Thus, by moving the control, the artist can effortlessly control the perception of depth of that segment or element without manual mathematical manipulation of each value(s) assigned by the weighted displacement. Even further, multiple controls can be assigned to enable the artist to manipulate portions of a scene individually, such as trees in a forest, leaves on a trees, birds in the sky, the depth position of the clouds in the background, all with equal ease, and without having to select or reselect these portions of the image.

In some embodiments, the data values assigned to the control are based on color values established by the selections and segmentations made on the original image. This corresponds to colors and gradients that directly represent the artists application of depth to the original images selections and segmentations.

Additionally, a combination of elements, segments, sub-segments, selections, and/or sub-selections may be grouped into a depth selection mask for rapid selection of the entire group by the artist. The depth selection mask (or group) may then be assigned to a different control for manipulation of values associated with the group as a whole, for example, to control depth of the group as described above. The interface also enables the artist to switch between the depth selection mask and the original material to ensure that the selections correspond, and, in turn, modify them as required by adjusting a variety of sliders which control, for example, Hue, Luminance, Saturation, gamma, Contrast, and edge modification tools, such as Blur, Erode/Dilate, Focus and a variety of other operators. In some embodiments, the image mask and/or the depth selection mask is based on grayscale rather than colors. It is not necessary for the image mask and depth selection mask to be different processes. In some embodiments, the image mask and/or depth selection mask and/or any targeted region (elements, segments, sub-segments, selections, and/or sub-selections) may have a one-to-one correlation and thus represent the same identity.

The depth selection mask acts as a visual representation of a monocular depth map similar to a computer vision display, where, for example, in one embodiment, white is the closest element, and black is the furthest element, with grey values representing the interpolation of depth there between. Simultaneously, on the large-format screen 307 (FIG. 3), the image is visualized in stereo with the depth selection mask applied to the working image from the artist's display 306. The interface controls (whether they be physical or mechanical dials or sliders or virtual sliders) provide the artist the ability to add or subtract elements from the depth selection mask which corresponds to depth. The manipulation is continually translated live to the large-format screen 307 in full 3D. As the artist moves or scrubs through the sequence in time, all of the selections and depth adjustments move appropriately with the selections. For example, if an actor's facial features are selected/segmented such that the eyes, nose, cheeks, hair are all distinct from the actor; and, the actor, in turn, is distinct from the background scenery, and any foreground items (for example, poles or bushes) are distinct from those portions selected by the artist using the depth selection mask, then those settings applied to the facial features will be applied throughout the sequence automatically. If there are any portions of that image that require additional attention, such as elements at the wrong depth, an element embedded spatially within a wall, or portions of the image that are warped or distorted in an unpleasing way, it will be determinable at the visual display or at the stereoscopic display, and can be corrected by the artist by manipulating the offending element.

Additionally, the segments and/or selections can be modified over time, the software interpolating those selections as requested. For example, by default, a first frame will have applied to it selected depth values chosen by the artist. As the element moves over time, the selected depth applied also moves with it in time. The artist can override the values and apply additional depth changes over the course of the sequence. In some embodiments, the current depth is represented as a color map corresponding to the original image on the artist's display, and the perceived depth in stereo will change on the large-format stereoscopic image. If the artist chooses to adjust a segment of that depth selection mask (for example, by moving a slider or dial of hardware control 305 or a virtual control of FIG. 4) it directly translates as that same element moving away or towards the viewer's perspective in stereoscopic 3D. Additional regions, zones and/or selections can be made or subtracted over time merely by using the controls to select the area on the display to adjust. For instance, the artist can click on a sub-selection or segment that includes the nose and eyes of an actor and push or pull both backwards in depth by using one or more of the controls, and then pull only the nose closer to the audience and/or pushing the eyes further back by manipulating another control. The artist may alternatively include the entire actor and all corresponding segmentations as a group and move the entire actor back and forth in depth within the scene. Moreover, by manipulating the interface, the artist can increase or decrease the total stereo effect of the entire image or sequence by adjusting the total strength of the depth effect.

In further embodiments, the software programs processor 302 to transform and project on a viewing screen 307 a visual representation of the processing steps performed, or to be performed. The representation takes the form of a link-association based network of visually represented symbols such as a data flowchart, whereby each processing step is represented by a shape (e.g., a rectangle) connected by a flow of control (see, for example, FIG. 12). For example, the flow of control can be represented by an arrow coming from one symbol and ending at another symbol to illustrate that control passes to the symbol that the arrow points to. An artist/editor/user of the system may then simply select, using a mouse or other similar device, a particular shape/symbol representing the processing step to be performed on the particular image.

In some embodiments, the software programs processor 302 to transform and project on a viewing screen 307 a visual flowchart for each frame, or selected sequence of frames, in the monocular sequence. The processing steps to be performed on each frame(s) is then arranged in a specific flow chart for that frame or frame sequence. Each processing step has a set of real valued control parameters for interactive selection, editing, and manipulation of image data. In one embodiment, each processing step is completely software controlled. Clicking on the symbol representing a processing step displays a dialogue box containing computer-generated representations of input controls (i.e., buttons, sliders, numerical/text entry) for input of the control parameters pertaining to that processing step. The parameters are changed through a typical mouse or keyboard.

Certain industry visual effects compositing software packages may have the ability, if modified appropriately, to perform the processing steps herein described. While there are many software packages and tools that may be suitable for such modification, it has been found that compositing programs are suitably situated due to their intense processing abilities for visual effects. Compositing programs are already used to create visual effects and digital compositing for film, high-definition (HD) video, and commercials and are thus suitable for manipulation of monocular and stereo image sequences. One such software package, FUSION created by EYEON Software Inc., incorporated herein by reference, employs a node based interface in a schematic view, and may be used and arranged in a fashion similar to the flowchart of the present invention. Modification of the FUSION software has been performed by the creation of several software plug-ins directed to warp and distort a 2D graphic image in a manner appropriate with this approach. Specifically, new programmatic tools were created on top of a generic distortion tool and further modified to incorporate initial values and sliders corresponding to the two-dimensional to three-dimensional conversion described herein. Depth sliders were further created to generate mathematical commands for uniformly changing depth selection values over any given segment to push and pull objects towards the operator in an intuitive fashion when the sliders are moved in one direction or another. Additionally, a software plug-in was created to warp/distort the image or pinch/pull the image in accordance with Step 5 described below, and when supplied with an appropriate depth selection mask, which is configurable by the artist, the adjustments to this tool allow for more pleasing and less destructive settings while also reducing artifacts and improving the quality of the new image. The modified software and custom plug-ins additionally allow the selection of specific segments to be modified and other corresponding values such as edge details to be changed within the plug-in interface, rather than moving backwards through the flowchart. Thus, more of the commonly accessed needs of the artist for the conversion process are encompassed within the custom plug-ins, being specifically prepared and modified for the conversion process disclosed herein. Additionally, the custom plug-ins allow for default values corresponding to specific types of images or scenes to be input and stored within the memory of the plug-ins for faster use, and, further incorporates mathematical modifiers, such as, for example, a "blur node," specifically tailored to the creation of stereoscopic images and which can be applied to the selections or segments at any step in the process (for example, at the weighted distortion step), rather than being restricted to application earlier within the flowchart.

In another embodiment, the interface may be represented by a network of specialized hardware components, or processing modules, for transformation of the frame or frame sequence. Each hardware component is connected by a system bus and implemented in conjunction with one or more modular programmable logic controllers whereby the processor and selection of processing modules is customized for the particular application or monocular sequence. Similar to the software implementation, each processing module including a series of dials or sliders for real valued input, and a mouse, trackball or input tablet for image editing, with generally the same exposure of parameters at each step to a human operator regardless of implementation. Such a system may be implemented via a audio/video multi-channel mixing console modified in accordance with the system and process disclosed herein.

In both software and hardware embodiments, one or more processing steps are performed for each frame in the monocular sequence. The input controls of the hardware and/or software interface allow for the manipulation of the parameters which affect that step, and the display of the input and output of that step, allowing for interactivity with the artist/user of the system. The interface includes a variety of parameter controls for image manipulation through use of the input controls. These controls are, for example, typically employed in the Depth Selection Mask Adjustment of Step 4, in order to achieve a particular effect for the Weighted Displacement of Step 5. One embodiment includes gradient falloffs or vignetting for achieving certain depth effects, removal of noise from the mask, and the like. This manipulation of the image selection map and the resulting effects are described in more detail in below.

Behind the interface, the software and/or hardware work together with a microprocessor to collect the appropriate input data from the interface controls and process the image and input data from and to the storage device. The specific parameters required for input, and the details of the 2D to 3D processing, are described in the following associated step subsections. It is important to note that while these steps are typically performed in sequence, it is not always necessary. Once the sequence is complete, a user can use the interface to revisit any of the steps to interactively make modifications to the parameters involved and immediately see the effect on the final output stereo image pair. In some embodiments, the sequence of steps depicted in FIGS. 2 and 3 can be considered a pipeline to be assembled, where the output of one step is used as the input fed into the following step. For example, once assembled, the image and mask information is propagated from step to step, starting with an image from the original sequence, to a final stereo image pair. Any modifications made through the interface to the parameters involved in any particular step can be immediately followed with a reprocessing of any step in the pipeline in order to update any subsequent information which might be affected. Any of these modifications can be performed interactively by the artist via the video monitors to observe their effects on any subsequent steps in real-time, including the final stereo image pair.

Step 1 Creation of Base Stereo Pair

FIGS. 5A through 5C depict the creation of a stereo pair of images in accordance with various embodiments of the invention. A first processing step takes an image from the original sequence and creates a base pair of stereo images which will act as a canvas upon which further refinements will be made, in order to make the final stereo pair a convincing representation of a 3D scene when presented to a human viewer. The original image is depicted by FIG. 5A. A transform is applied to the original image, and consists of a simple translation in the x direction. As depicted by FIG. 5B, this will introduce a uniform baseline disparity between the images that will then be modified in subsequent processing steps and allows the elements to be placed at a depth position chosen by the user.

In this embodiment, the transformation is of the form $$T_p = p^1 \text{ where } T = \begin{bmatrix} 1 & 0 & t_x \\ 0 & 1 & 0 \\ 0 & 0 & 1 \end{bmatrix}, \quad \text{Eq. 1}$$

$$p = \begin{bmatrix} x \\ y \\ 1 \end{bmatrix}^T \text{ and } p^1 = \begin{bmatrix} x^1 \\ y^1 \\ 1 \end{bmatrix}^T$$

T transforms pixel locations ρ from the original image by shifting them in the x direction by $t_x$ to end up at location p'. Since the translation value $t_x$ can be any real value, any transformed images may require the values to be reconstructed at each integral pixel location. Alternatively, the inverse transformation $T^1$ can be applied to each pixel location p' in the target image, in order to determine the coordinates p, which will map to it from the original image. In some embodiments, a reconstruction of pixel information will need to be performed as remappings may not fall directly on pixel locations. This can be done using any number of interpolation schemes, such as bilinear, bicubic, spline, sinc, etc. In one embodiment, a simple bilinear interpolation is used.

FIG. 5A illustrates an original image, and, FIGS. 5B and 5C depict the base stereo pairs created by applying the translation defined by T. Pixels are illustrated as boxes in the grid. They contain either a color sample (in this case, black or white), or an 'X', which indicates that no information is present for that particular pixel location. This absence of information is the result of shifting samples onto the image grid for which information does not exist in the original image (i.e. it is out of the view of the camera which captured the original image). This undesirable effect is accounted for in subsequent steps of the process for the pixel interpolation.

The translation can be applied to the original image 501 (FIG. 5A) once, giving a pair of images of which one is the original 501 and one is a transformed version 502 (FIG. 5B). The transform can also be applied twice separately with different values of $t_x$, giving a pair of images which are both transformed versions of the original (FIG. 5C). Regardless, this gives the process a base pair of stereo images with a base depth/disparity to begin refining. True stereo images differ in a manner consistent with the difference in the viewpoints from which they were captured, and it is this disparity that the visual system interprets to achieve a stereo depth effect. No relative depth information will yet be present in this base pair of images due to the uniform disparity across the images created by the single uniform translation. One image is chosen to be the Left Eye (LE) of the stereo image pair, and the other to be the Right Eye (RE) image.

At this point, with the appropriate stereo hardware setup, such as is described above, these images can now be displayed to a human viewer and any further adjustments to the transformation T, or any further steps in the process, can be made interactively by an artist or operator of the system. The stereo hardware setup works as described in a previous section. The interface of the system allows for the specification of a frame from the original sequence to be transformed by inputting a sequence number or name and correctly displays and aligns the pair of subsequent stereo image pairs over the same screen space, allowing for the stereo depth effect. At the same time, the interface presents the artist with the ability to easily adjust the parameters of the translation(s) via a dial or slider, in this case a $t_x$ value for one or two translations to be applied to the frame of the original sequence as described above and in FIGS. 5A through 5C. The translations(s) are then applied with the new parameters to a digital copy of the frame from the original sequence, and the stereo pair is immediately redisplayed for evaluation, allowing for an interactive adjustment of this initial base stereo pair of images to achieve the desired effect.

Step 2 Radial Distortion

The presence of radial distortion in an image has been perceived as an undesirable side effect of the imperfection of an imaging system. As such, in prior art processes, these distortions are removed when present. However, the inventor has found that the introduction of such distortions to an otherwise undistorted image has the general perceptive effect of bringing the elements near the edges of the image closer to the human operator, while pushing the elements in the center of the image further away. That is, when applied in accordance with embodiments of the system and process disclosed herein, it adds an impression of relative depth to an image, which can be applied separately to a base pair of stereo images, for instance, as created in Step 1 to create a pleasing stereo depth effect. At the same time, applying such a distortion to an image can remap the pixel data to regions of the image that currently have an absence of information, for example, as a result of Step 1.

Figure 6A:
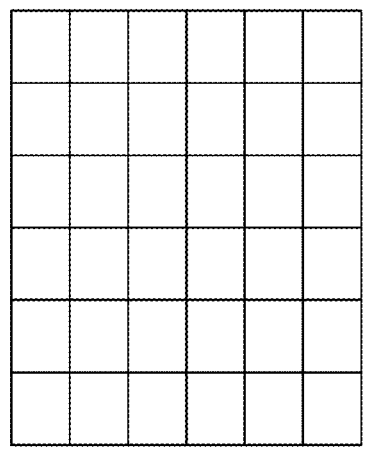
FIGS. 6A through 6C depict a radial distortion applied to an original image in accordance with an embodiment of the present invention.
Figure 6B:
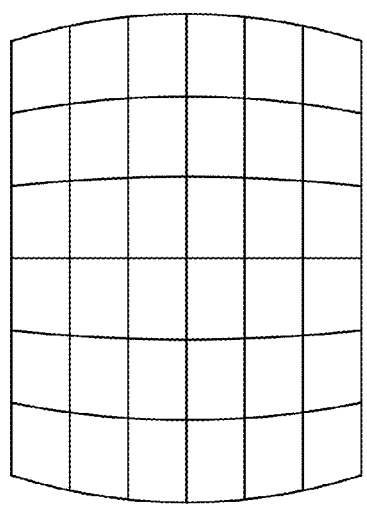
Figure 6C:
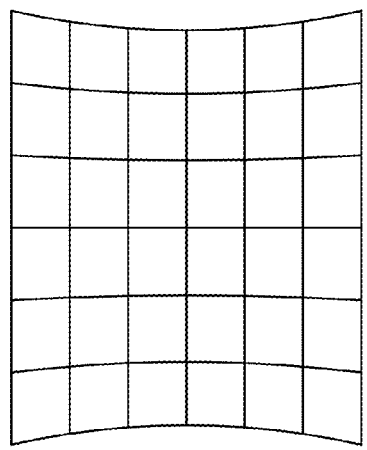

FIGS. 6A through 6C depict a working image and various distortion effects that may be applied to the image. The application of a Radial Distortion of Step 2 has two purposes. The first is to account for any null information now present at the edges of the images as a result of the initial transformations in Step 1. The second is to add an initial impression of relative depth to each stereo image pair. These are both accomplished through the application of a separate nonlinear remapping to each of the LE and RE images. The mapping is based upon first order radial distortions known to typically be present in many lens-based optical imaging systems.

Two types of radial distortion often observed in captured images are barrel and pincushion distortion, illustrated by FIGS. 6B and 6C. Such captured images have been processed by prior art processes to remove distortions as they can introduce undesirable effects which manifest as visible false nonlinearities. In one embodiment of the system and process described herein, however, radial distortion is modeled as affecting sample data a radial distance from a defined center of distortion $(c_y, c_y)$. Techniques suitable for modeling radial distortion can be found in R. Tsai, *A versatile camera calibration technique for high-accuracy 3D machine vision metrology using off-the-shelf TV cameras and lenses*, in 3.4 IEEE JOURNAL OF ROBOTICS AND AUTOMATION 323-344 (IBM T. J. Watson Research Center 1987), incorporated in its entirety herein by reference.

For a pixel at location (x, y) on the image grid, the distance vector from the center of distortion to an undistorted pixel location is $(x_u, y_u) = (x, y) - (c_x, c_y)$. The radial distance is then shown by $$r = \sqrt{x_u^2 + y_u^2}.\qquad\text{Eq. 2}$$

The relationship of a distorted and undistorted pixel location relative to the center of the distortion is described by the following equations:

$$x_d = x_u(1 + \kappa r^2) \qquad\text{Eq. 3:}$$

$$y_d = y_u(1 + \kappa r^2) \qquad\text{Eq. 4:}$$

where $(x_u, y_u)$ is the undistorted pixel location associated with the distorted pixel location $(x_d, y_d)$, and $\kappa$ is the coefficient of distortion. The severity of the distortion can be controlled by simply changing $\kappa$. Radial distortion is typically modeled using only a first power of two, although it can be modeled using several powers of two on the radial component $\tau$. In some embodiments, models will occasionally include a second power of two term and rarely, if ever, include higher powers of two. Such additional higher order terms can be applied, but, in some embodiments, may appear to be unnecessary in this context and can detract from the desired effect.

Both of these effects are accomplished through an application of equations 3 and 4 (above) for each pixel location, as though performing a distortion removal for each of the LE and RE images. In some embodiments, applying a distortion removal to an each of these undistorted images has a similar effect on each image as illustrated in FIG. 6C. In some embodiments, the distortion removal is applied in only the x direction, since the intent is to produce disparities in the base stereo pair that would mimic the kind of disparities in an actual stereo pair. Since such disparities can arise due to the horizontal difference between the cameras imaging a scene, in some embodiments, disparities in the stereo pair should appear in the x direction only.

Specifically, in some embodiments, for each pixel location $(x_u, y_u)$ in the new target image, the second equation is used to determine the location $(x_d, y_d)$ of the pixel in the current image, where $y_d$ remains unchanged. The pixel value for $(x_u, y_u)$ can then be reconstructed using any interpolation scheme, such as bilinear, bicubic, spline, sinc, etc. In one embodiment, bilinear interpolation is used. In some embodiments, the center of distortion $(c_x, c_y)$ in the images are placed off-center to the left for the LE image, and off-center to the right for the RE image. The precise locations of the centers of distortion are determined by the artist and are entirely subjective based upon the desired effect.

It is also entirely possible to perform a full radial distortion removal upon each image using both equations 3 and 4 if the resulting effect is found to be more desirable. It is also possible that this effect may or may not be applied at all, depending upon the nature of the elements in the scene and upon the final desired stereo depth effect for the particular image pair.

The centers of distortion $(c_y, c_y)$ for each image in the stereo pair, as well as the strength of the distortion, determined by $\kappa$, are manipulated through the interface, which allows the artist to alter their values interactively and to observe the effect they have on the stereo image pair. The manipulation of these values by the interface is provided via a video monitor, processor, and by input received from either video or hardware controls, or a combination thereof, including buttons, sliders, and inputs for alpha-numeric entry of variables. In one embodiment, the video inputs include a series of menus and dialog boxes for control of the processor and individual processing steps (for example, visually represented buttons, sliders, etc. shown in FIG. 4). In another aspect, the input controls are implemented through hardware as physical buttons, sliders, dials, and/or keyboard or mouse input (see, for example, FIG. 3). Input device adjustments can be made to achieve the desired effect using the input controls. The parameters may also be animated and/or modified over time to account for any desired changes in the effect during the course of the sequence.

Step 3 Weighted Selection

The purpose of the Weighted Selection of Step 3 is to create a depth selection mask indicating which elements or segments of one of the images in the stereo pair are to be displaced in subsequent steps of the process. This displacement of selected image elements is necessary in order to produce disparities in the final stereo image pair that are required to induce a stereo depth effect. The depth selection mask is created by assigning a real value in the range [0,1] to each pixel location in a selected image of the stereo pair, indicating the weight of the selection based upon two separate ideas that are common to image selection/segmentation methods and then projecting those values into a corresponding pixel-wise appearance model of weighted values.

3(a)-Selection of Image Features

A set of image features (for example, color, optical flow, and the like) in an image of the stereo pair is chosen upon which to base the selection process. The term image feature denotes any information that is either present in or can be derived from the image, either by itself, or within the context of the sequence of images of which it is a part. It should also be possible to associate these features with one or more pixel locations in the image.

One or more of the image features of luminance, saturation, and color contained in each pixel sample of the frame from the original sequence may be used as a basis for the selection process. Several representations are available for color information. In one embodiment, both the RGB and HSV color spaces are used, on a channel-wise basis. That is, the Red, Green, and Blue channels are treated as separate features as well as the Hue, Saturation, and Value channels. However, any other color representation can be considered a valid image feature, as well as any combination of the color representation's separate channels. Many other possibilities exist here for generalizing this selection step to take advantage of any number of image features. Such additional features could include but are not limited to gradient (edge) information, texture, optical flow, and the like.

3(b)-Selection Weights

Using the set of image features chosen in 3(a), above, the selection process then determines a real value in the normalized range [0,1] for each pixel location (depth selection value). The selection process accomplishes this by defining a pixel-wise appearance model for the selection based on the above selected image features, and then determining how well the image features present at each pixel fit with this model. In some embodiments, the selection process models each selection with a range of accepted values for the various image features being used, as well as a falloff function, both of which are specified by the artist. Fitness for a pixel is determined by examining its feature values and comparing it to the specified range and, when appropriate, applying the falloff function. In some embodiments, this modeling process is accomplished by using suitable programming commands known in the art to control processor 302 to manipulate the data accordingly. The result of the modeling process is stored in a buffer or storage 301 for future use.

For each feature, a range is specified by a lower and upper bound, $r_l$ and $r_u$. For example, any pixels whose feature values, p, fall within the corresponding interval $[r_l, r_u]$ will be given a selection weight of 1.0. Any values falling outside of this range will be given a weight in the range [0, 1] based upon the falloff function. In some embodiments, the falloff function, $f(x)$, is an arbitrary non-increasing real valued function with a range of [0, 1]. Falloff values can be determined by applying $f(x)$ on a per feature basis, where $$x=\min(|p-r_l|,|p-r_u|) \qquad \text{Eq. 5:}$$

defines the distance between the closest range bounds and the feature value for each pixel location. The resulting falloff values for each feature can then be combined by processor 302 in accordance with software programming using measures such as the average or median to arrive at the real valued selection weight to be assigned to the pixel. Alternatively, in some embodiments, $f(x)$ could be applied once to the distance between the vectors of corresponding features and range values, where $$x=\|\min((p-r_l),(p-r_u))\| \qquad \text{Eq. 6:}$$

with p denoting the vector of feature values at a pixel, $r_l$, and n denoting the vector of range bounds for the features and the min of the vector valued arguments resulting in a vector of component wise minima. The possibilities for applicable falloff functions are quite numerable. The specific falloff function employed and the manner in which its output is used to determine the selection weight for each pixel is determined on a case-by-case basis. This determination can be accomplished either automatically by processor 302 in accordance with suitable programming commands or through manual input by the artist utilizing pointing device 303, input device 304, and/or controls 305.

The above pixel-wise selection process based on ranges and a falloff function is, however, only one possible approach to performing a weighted selection. There are any number of ways in which a selection could be modeled, and in addition, any number of ways that a normalized value in the range, for example the range [0,1], could be assigned to each pixel to indicate its fitness to that model.

One option is to use a single nonlinear multidimensional function, such as a Gaussian distribution, to represent the selection. A canonical pixel could be used to define the mean of the distribution, accompanied by a specified variance. Each pixel could then be assigned a selection weight based upon the evaluation of the Gaussian distribution with the pixel feature vector as the argument. Other possibilities include employing a more complex probabilistic model which could facilitate the assignment of a real value to each pixel in the image. Graphical models such as Conditional or Markov Random Fields, as described in CHRISTOPHER M. BISHOP, PATTERN RECOGNITION AND MACHINE LEARNING (Springer 1st ed. 2006), incorporated herein in its entirety by reference, are particularly applicable in such situations, using any number of possible inference schemes. A Graph-Cut based algorithm, such as that described by V. Zabin Kolmogorov, *What energy functions can be minimized via graph cuts?*, in 26.2 IEEE TRANSACTIONS ON PATTERN ANALYSIS AND MACHINE INTELLIGENCE 147-159 (Dept. Comp. Sci., Cornell Univ. 2004), incorporated herein in its entirety by reference, may also be applicable in this situation. Additionally, the temporally coherent nature of an image sequence could be further exploited. That is, the similarity of an object's position and appearance over time could take a more explicit representation in any employed model. Regardless, any process for intelligently assigning a real value to each pixel in the image could potentially be used in the weighted selection step, and then normalized to the range [0,1].

The feature range bounds and falloff function parameters are programmed into processor 302 and/or stored by storage 301 to be available to the artist via the hardware and software interface, though any other appropriate model employed in the selection step can have its parameters made available in a similar manner. This allows the artist to alter the parameter values interactively and observe the effect they have on the resulting depth selection mask. Adjustments to parameter values can be made to improve the quality of the current selection by manually entering them into the interface, or by using the interface to interactively select any number of pixels which contain the desired range of values in either of the displayed images of the stereo pair. Any of the parameters of the selection model can also be animated over time to account for any desired changes in the selection as the sequence progresses.

Step 4 Depth Selection Mask Adjustment

The Depth Selection Mask Adjustment of Step 4 allows the artist to modify the image mask and/or the depth selection mask produced by Step 3 to improve the quality of the selection, and thus the quality of the depth selection mask created by application of an image mask. In some embodiments, this step is not necessary, depending upon the image mask produced by Step 3, and upon the desired effect in the subsequent Weighted Displacement step of the process (Step 5). This modification can take many forms. It can be as automatic as applying an image filter to smooth out any hard edges in the image selection map which may cause problems in the subsequent displacement step. For example, a noisy image selection map can cause a noisy displacement of the image in the following step, causing visual problems and ruining the stereo depth effect.

Adjustment of the depth selection mask can, in some embodiments, be as manually involved as creating a separate image mask to be multiplied pixel-wise against the depth selection mask in order to add, remove, or modify mask elements that were incorrectly selected in the previous step. For example, a scene containing a red sports car in front of an apple tree would require a shifting of the sports car in the foreground to create a disparity for the stereo depth effect. This would require the selection of the red car so it could be displaced in the next step. However, a color based selection is likely to include the red apples on the tree in the background, even though it is not desirable to displace these elements along with the car. The image mask and/or depth selection mask can be modified and/or employed to remove such erroneous selections.

In some embodiments, processor 302 of the interface is programmed to provide the artist with a range of options for applying image processing algorithms. These include smoothing filters, such as a standard Gaussian filter and frequency domain based low-pass filters, although any smoothing filter could be applied in this step. The smoothing filters aim to reduce sharp ridges or edges in the selection mask where these effects are undesirable. Smoothing filters can also be applied to close unwanted small gaps of low selection weights in an otherwise uniformly high selection weight region of the mask, or vice versa.

In some embodiments, morphological operations such as erosion and dilation of non-zero selection weight values are also provided by the interface. These operations allow for the growing or shrinking of selection regions as desired, and are also an effective tool in removing the gaps in image masks as mentioned above for smoothing filters. Any variation on these standard morphological operators could be applied in this step.

In other embodiments, the interface may also provide filters and algorithms to facilitate noise removal from the image selection map. These can include edge aware filters, such as median filters which are particularly effective at removing salt and pepper noise, as well as bilateral filters for smoothing out noisy regions while still preserving edge information.

A variety of image processing techniques can be provided to the artist by the interface and employed in this step to modify the depth selection mask and/or image mask from Step 3. Additionally, any of the above filters or techniques can be extended to consider information from previous or subsequent image selection maps in order to apply their effects over time as well. For example, a Gaussian smoothing filter could be extended into the third-dimension (along a z axis) in order to incorporate pixels information from previous or subsequent frames and smooth image mask information over time. Such an approach might be employed to avoid any abrupt changes in depth selection mask values in adjacent images in the sequence, which could result in obvious visual artifacts in the final sequence of stereo image pairs.

Also applicable to this step are less automatic techniques which allow the artist to manually adjust the selection weight values in each pixel of the image. The interface allows the artist to manipulate this pixel data in a number of ways. In some embodiments, this includes a set of painting tools for editing image values. In other embodiments, it also includes a set of tools for creation of complimentary image masks which can be applied to the image selection map in order to effect a modification of its values.

Figure 7D:
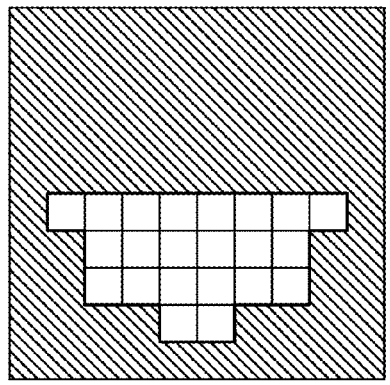
FIGS. 7A through 7D depict a first exemplary process for creating a depth selection mask in accordance an embodiment of the present invention.
Figure 7C:
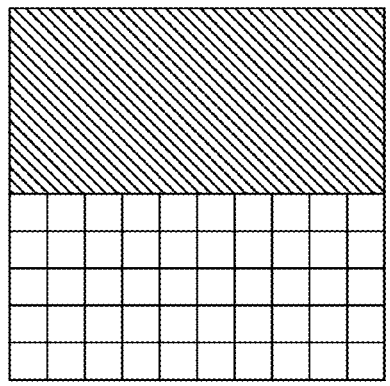
Figure 7B:
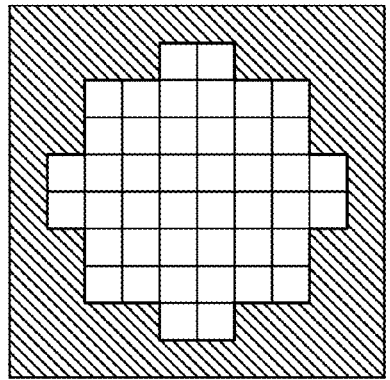
Figure 7A:
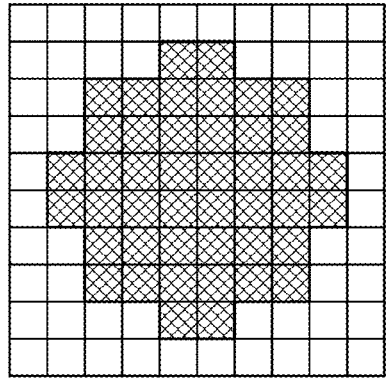

FIG. 7A depicts an example of a possible simple image obtained from a stereo pair of images, and, FIG. 7B depicts a possible first depth selection mask resulting from a Weighted Selection of the entire image. The hatch pattern of FIG. 7B represents the areas excluded from the selected image by the image mask applied at Step 3. To further illustrate the process, as an example, presume the selection of only the left half of the hatched dot is desired. FIG. 7C depicts an image mask wherein the white grid boxes indicate pixels with mask values of 1.0, and the hatched areas indicate pixels with mask values of 0.0. Multiplying this mask pixel-wise against the working image using techniques known in the art results in a new depth selection mask as illustrated in FIG. 7D.

In some embodiments, masks which might be used to modify the working image and/or the image selection map include gradient or vignette masks. Such masks, when used together with the vector field remapping of Step 6, can incorporate a gradual change in depth in the final stereo pair.

Figure 8D:
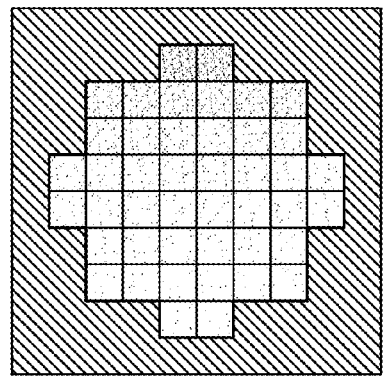
FIGS. 8A through 8D depict a second exemplary process for creating a depth selection mask in accordance an embodiment of the present invention.
Figure 8C:
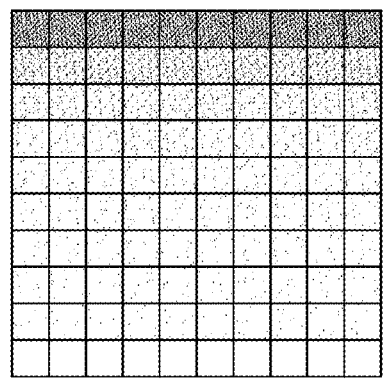
Figure 8B:
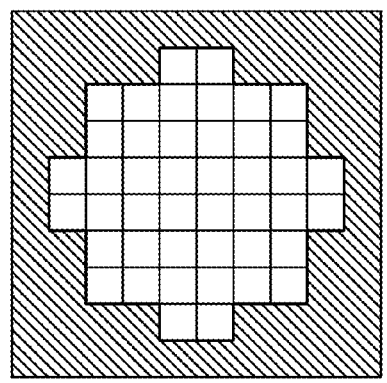
Figure 8A:
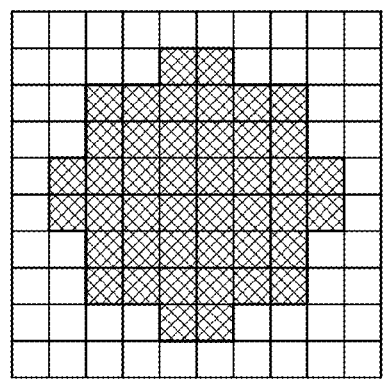
Figure 10C:
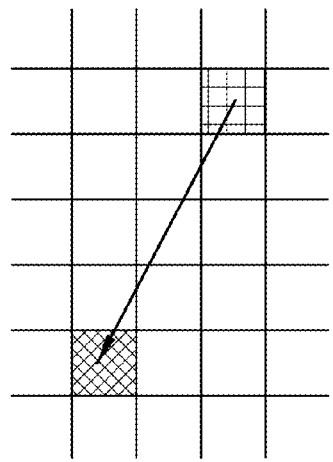
FIGS. 10A thought 10J depict an exemplary result on a single pixel of a displacement processing step in accordance with an embodiment of the present invention.
Figure 10B:
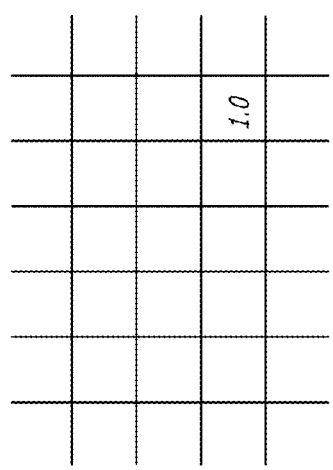
Figure 10E:
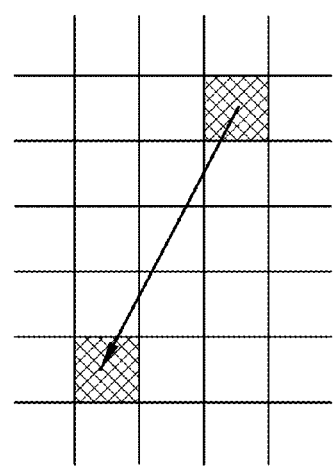
Figure 10A:
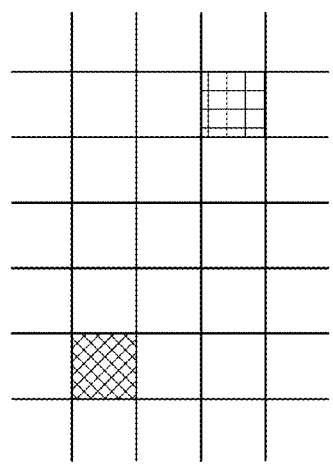
Figure 10D:
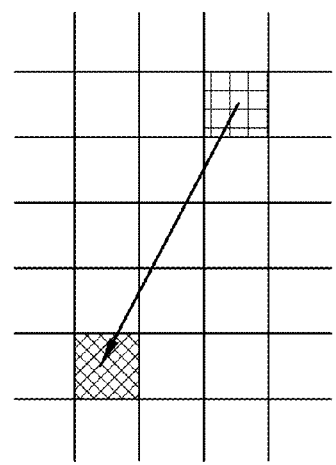
Figure 10H:
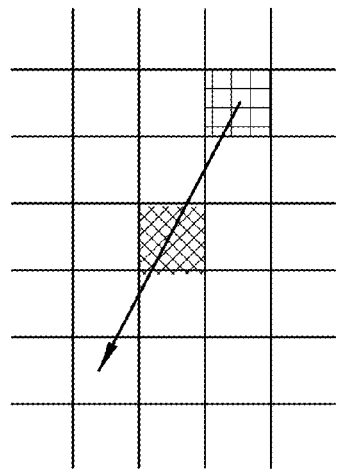
Figure 10G:
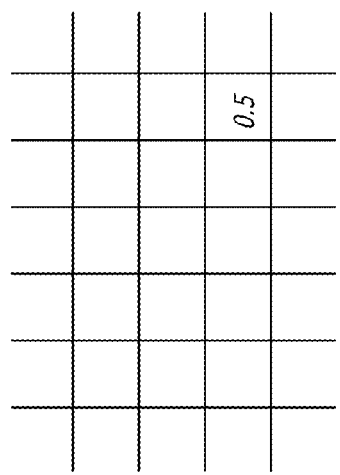
Figure 10J:
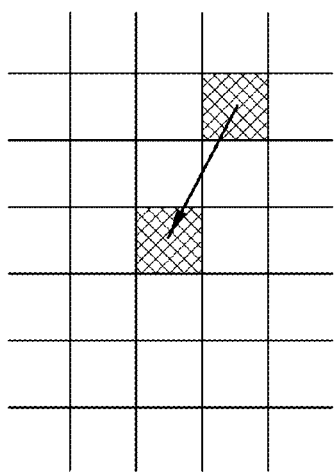
Figure 10F:
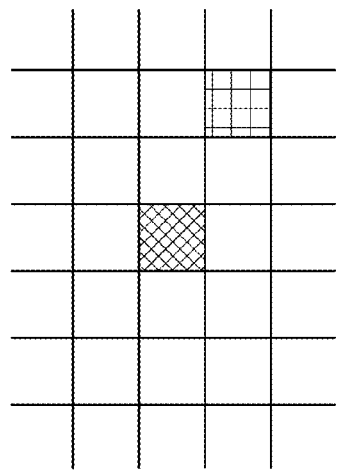
Figure 10I:
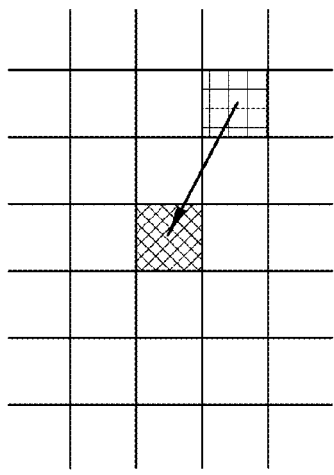

FIG. 8A through 8D depict a further embodiment of the application of an image mask through multiplication of a gradient image. As an example, FIG. 8A depicts a possible simple image from a stereo pair, and, FIG. 8B depicts a possible depth selection mask resulting from a Weighted Selection of the image. FIG. 8C illustrates a gradient image mask, where mask values slowly decrease in value from 1.0 at the left side of the image to 0.0 on the right side of the image. Multiplying this gradient mask pixel-wise against the selection mask will result in a new image selection map as depicted by FIG. 8D.

The creation of such masks and/or depth selection masks is completely dependent upon the desired result of their combination with the working image and the desired final image selection map. Image masks can be applied any number of times to the working image, the same mask and/or subsequent masks resulting from previous combinations, until the desired modification of the image selection map is obtained. Any process for assigning a real value to each pixel in the mask can be used in this step and provided by the interface to the artist. The application of one image mask to another is not limited to multiplication. Any number of mathematical operations can be employed to achieve the desired effect, including addition, subtraction, division, and the like. The application need not include only a single mask to be applied to the selection map, but could be the product of an operation requiring multiple image masks, including image masks used by previous or subsequent images in the sequence.

The values in these masks can be animated and/or modified over time to account for any desired changes it should effect in its application to the working image, segment thereof, and/or depth selection mask, as the sequence progresses. This can be done through a direct manipulation of the pixel values in the image, or through parameters exposed to the operator by the interface for the various methods employed in creating the masks. Again, in some embodiments, this step will not be necessary, depending on the quality of the image mask and/or depth selection mask received from Steps 3 and/or 4. Any of the parameters used in the various techniques applied in this post processing step can be animated over time to account for any desired changes they should effect in their application to the image selection map resulting from the foregoing steps.

Step 5 Weighted Displacement

The goal of the Weighted Displacement of Step 5 is to modify the working image so that the stereo image pair to which it belongs exhibits the kinds of disparities necessary to induce the perception of stereo depth. Weighted Displacement takes the image selection map (whether it was created directly from Step 3 or a modified version from Step 4) and shifts the elements indicated by the image selection map for the associated image. This is accomplished through a displacement of image pixels which is weighted by the selection and segmentation mask values (depth selection values) of the depth selection mask.

For example, as depicted by FIGS. 9A through 9D, foreground elements are often shifted to the left or right more significantly to create a disparity, as compared to background elements. The image of car 901 in FIG. 9A has a selection performed on it producing a image selection map, which is then modified with a gradient and blur to produce depth selection mask 902 depicted in FIG. 9C. This depth selection mask is then used with a horizontal displacement to the right to produce FIG. 9B, which would be used as a left eye (LE) image of the stereo pair. FIGS. 9A and 9B are aligned and include reference lines 903 so that an observer can easily see that the car becomes visibly shifted to the right in the foreground. FIG. 9D depicts the degree of horizontal displacement of the pixels of the image. The displacement decreases into the background due to the gradient effect in image selection map 902, with the higher luminosity present the greater the displacement. This also mimics what would be seen in a true stereo pair, where elements closer to the camera have a larger disparity which decreases the further the elements are away (although the displacement distortion is relatively extreme in this case for illustrative purposes). Note that no new visual information has been added, and any would-be blanks that would have been produced by the shifting of occlusions are filled by the warping or distortion of the image. When the image is recombined in a stereo pair, this divergence corresponds directly with horizontal parallax and occlusion revelation, two key factors in stereoscopic perception. With additional segmentation of the image, further refinements such as pushing the trees in the background further away in 3D space, are easily applied. Vertical grid lines 903 have been overlaid on the images to make it easier to distinguish the differences. Note that had this process been performed on the RE image the weighted displacement would be toward the left.

FIGS. 10A through 10J depict a displacement defined by a two-dimensional vector field indicating an offset for each pixel location in the image to another location in the image. The magnitudes of the offsets in the vector field are adjusted by multiplying the per-pixel normalized real values in the range [0,1] from the image selection map to the corresponding offsets in the vector field. In some embodiments, the desired result is to alter the remapping in a manner which varies proportionally to the weight of the pixel as determined in the Weighted Selection of Step 3 (subject to any modifications in the Selection Mask Adjustment of Step 4). Then, for each pixel location, the offset at that pixel location is applied to determine a new pixel location. The value at the new location is mapped to the current pixel. Specifically, the vector field V: $\mathbb{R}^2 \to \mathbb{R}^2$ has a value at every (x,y) pixel location in the image I. Recall that an image I is a mapping I: $\mathbb{R}^2 \to \mathbb{R}^n$, where $\mathbb{R}^n$ is an arbitrary feature space. In this case, n=3, and the 3 vector values consist of the red green and blue color space values for a given (x,y) pixel location, although any number of features could be present at a given pixel, including optical flow or different color space values.

For each of the V (x,y) pixel locations, a two dimensional vector value $(v_x, v_y)$ exists. These vector values are multiplied with the scalar mask values M (x,y) at their corresponding locations to produce a resulting vector field V'(x,y)=$(v^1_x, v^1_y)$=M (x,y) V (x,y). This resulting vector field is then used to remap the values at each image pixel location I (x,y) by copying the value from the location indicated by (x,y)+V' (x,y) to create a new image I' (x,y). This relationship is described by equation 7 below.

$$I^1(x,y)=I(x+v^1_x, y+v^1_y) \qquad \text{Eq. 7:}$$

This location may not fall precisely on a pixel sample, and the value will have to be reconstructed. In some embodiments, any interpolation scheme can be used, such as bilinear, bicubic, spline, sinc, etc. In one embodiment, a simple bilinear interpolation is used. Due to the fact that disparities in stereo images are typically exhibited only horizontally, in some embodiments, the vectors in the vector field have only a non-zero x component, while the y component is set to 0, however this does not have to be the case. The vector field can be animated over time to account for any desired changes in the remapping as the sequence progresses.

An illustration of this displacement process is depicted in FIGS. 10 and 11. FIGS. 10A through 10J depict the effect of the displacement on a single pixel. FIG. 10A shows a portion of an image and the color at two different pixels (by varying hatch pattern). FIG. 10B shows the mask values for a pixel, while FIG. 10C shows the corresponding displacement vector at that pixel. Notice that the vector points from its source location, the square-hatched pixel, to the other illustrated pixel in the image, the cross-hatched pixel, as illustrated in FIG. 10D. FIG. 10E shows the resulting image pixel values after the displacement step; that is, the value pointed at from the square-hatched pixel, where the vector originates, has been replaced by the value that the vector pointed to at the cross-hatched pixel. FIGS. 10A through 10E are illustrative of a vector determined by a depth selection value of 1.0. FIGS. 10F through 10J are illustrative of a vector determined by a depth selection value of 0.5.

Figure 11A:
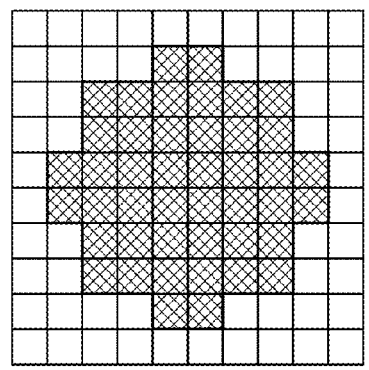
FIGS. 11A through 11F depict a vector field created by the application of a depth selection mask in accordance with an embodiment of the present invention.
Figure 11B:
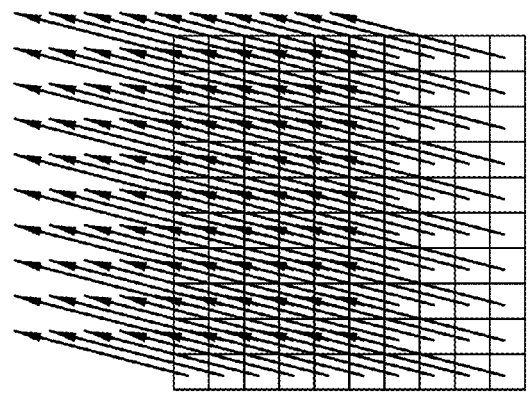
Figure 11C:
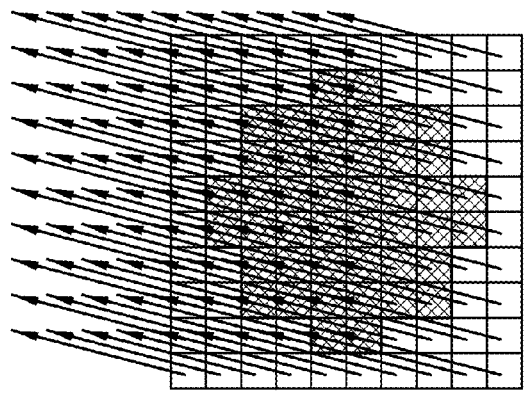
Figure 11D:
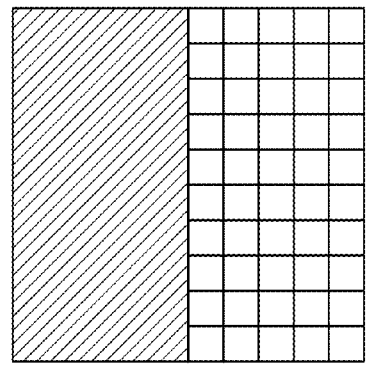
Figure 11E:
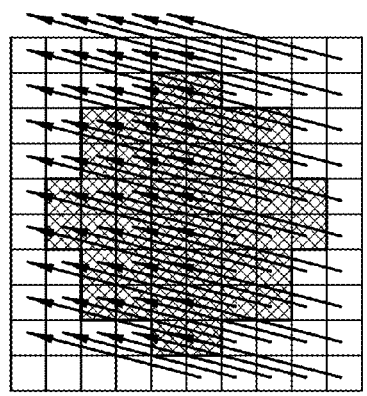
Figure 11F:
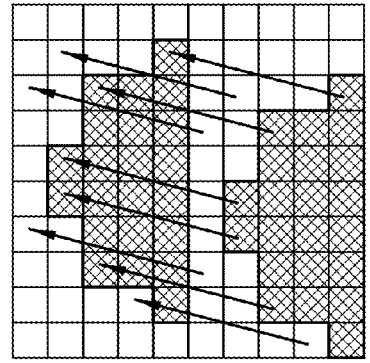

FIG. 11A depicts an image, I, and, FIG. 11B depicts a uniform vector field V defined by the vector (5,1). FIG. 11C depicts the image overlaid with the uniform vector field. FIG. 11D depicts a possible selection mask, the white grid cells indicating a 1.0 mask value, and the hatched grid cells indicating a 0.0 mask value. FIG. 11E depicts the overlaid vector field after the image mask and/or depth selection mask has been applied to the working image. Notice the absence of vectors originating from the right half of the pixel locations. The application of the displacement has caused these vector values to be zeroed. FIG. 11F further depicts the image once the vector field displacement has been applied (some vectors from the masked vector field have been overlayed to illustrate the mapping).

The current process uses the depth selection mask and vector field to determine offsets into the image from which to copy or pull data to the current location; it is also possible to perform the inverse operation. In some embodiments, another mask can be used in conjunction with a vector field to push image information from the source location in the direction specified by the vector. The above detailed approach is one of several approaches that may be used and is illustrative of some embodiments for practicing the invention.

As previously described, the interface allows the artist to create a uniform vector field by specifying a two dimensional vector to comprise the field, as well as selecting a mask and/or depth selection mask to apply to the vector field. The weights contained in the selection criteria then scale the actual offset values appropriately to create a non-uniform displacement effect. However, this step still allows for a more complex and varied vector field to be applied if it would increase the overall desired effect for any particular sequence, and, in some embodiments, the interface is modified to expose the appropriate functionality to an artist to facilitate the creation and/or modification of the vector field. Adjustments made to the vector field in this step will immediately have an impact on the appearance of the stereo pair, enabling immediate viewing and refinement, interactively by the artist.

Step 6-Final Adjustment

Once steps 3 through 5 have been performed any number of times to achieve the desired stereo result, there may be a resulting absence of pixel information around the edges of either image that has been modified. In some instances, this results from shifting null information into the image in a fashion similar to that after the initial transformation applied in Step 1 and illustrated in FIG. 5C. A final remapping of either image can be performed at this step to either repopulate this null information, or to resize or crop the image to exclude it.

In one embodiment, this step includes a simple cropping of the image to remove any areas around the edge with null information. In another embodiment, a simple image stretch is applied. In other embodiments, a remapping based upon radial distortion (such as described in Step 2) can also be applied. As such, any number of image transforms could be applied at this step to account for the missing information. In some embodiments, the parameters governing these operations are provided by the interface and allow for an interactive adjustment of the image transformation.

Exemplary Illustration of the Interface

Figure 12:
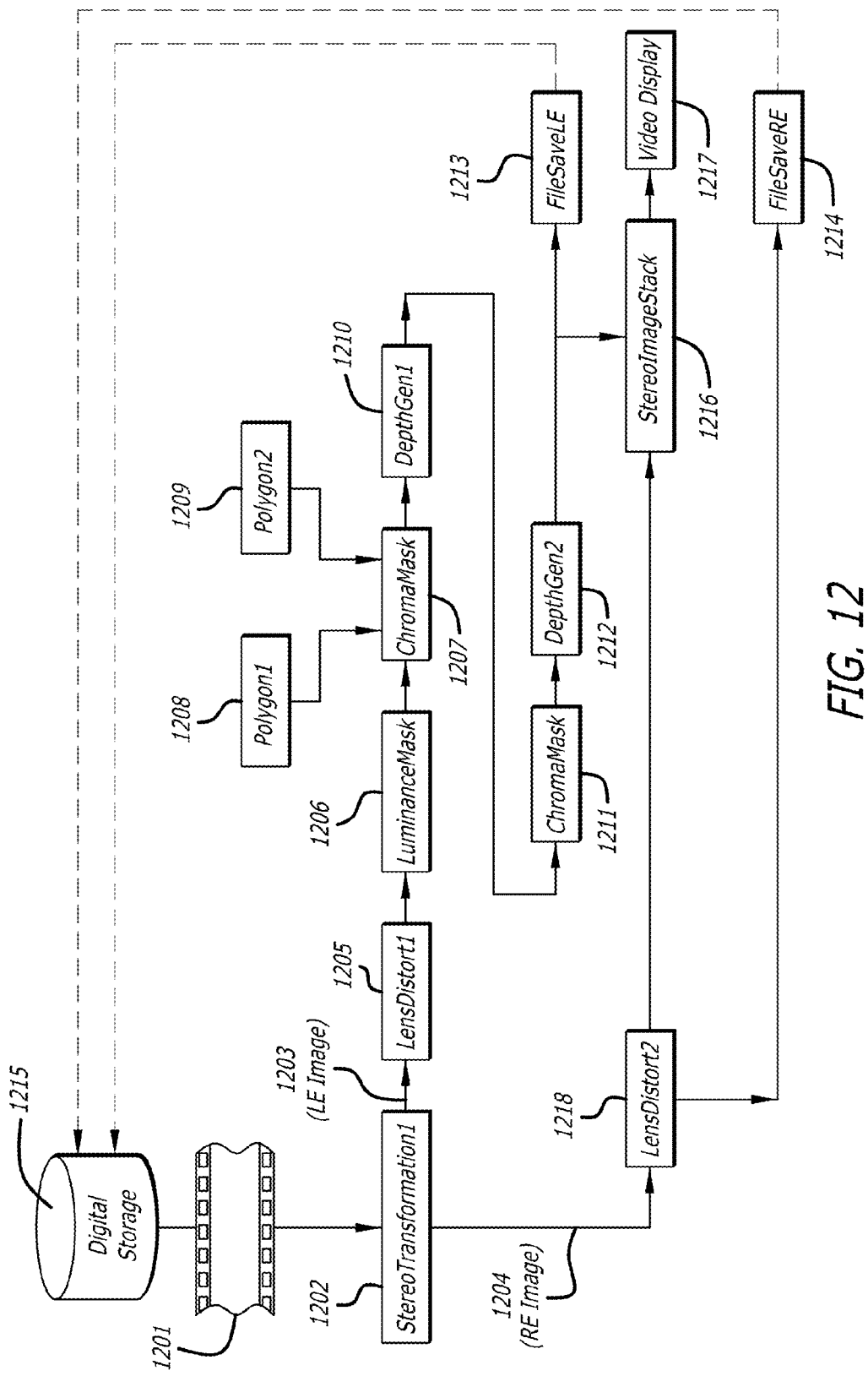
FIG. 12 is a depiction of an exemplary process sequence diagram for transforming 2D images into a 3D images in accordance with an embodiment of the present invention.

FIG. 12 is an exemplary depiction of a node-based sequence diagram in accordance with aspects of the software Interface described herein. Such a sequence diagram can be interactively displayed to the artist on a monitor during the conversion process to allow the artist to view the changes that have been made to the original image. This visual illustration is advantageous because each processing node is representative of programming commands incorporated in the software embodying the various steps of the embodiments described herein. Such commands may be automatic, or the node may open to provide the artist with an input box (for example, similar to the visual controls depicted by FIG. 4) to select parameters or processes to be used.

As shown in FIG. 12, a frame 1201 is selected from a monocular sequence of images, and a processing flow is started for the frame. Using the Interface disclosed herein, the transform operation of Step 1 is applied by the creation of a first processing node 1202 ("StereoTransformation1"). In this processing step, a transformation operator is applied to a copy of the original image to create the stereo pair and to make a transformed LE image 1203 to work with, and another copy of the image (which will remain unedited) becomes the RE image 1204. The flow control is formed by two branches, one for the LE image and one for the RE image, which now originate from first processing node 1202. In this example, an operator is also applied at this step to crop the image (from letterbox to standard screen format).

A second processing node 1205 ("LensDistort1") is created to apply the radial distortion of Processing Step 2 to the LE image 1203 of the first branch. This distortion step, and subsequent steps, may also be applied to the RE image branch as well, however, for illustrative purposes, only further manipulation of LE image 1203 is performed.

From the second processing node 1205, LE image 1203 then gets piped (a flow control is formed) into a third processing node 1206 ("LuminanceMask") and a fourth processing node 1207 ("ChromaMask") for the application of the image mask of Processing Steps 3 and 4 to select the portions of the image for which depth will be simulated/adjusted (via a depth selection mask). A first image mask is selected to use luminance to perform the weighted selection of image elements. The output from this first image mask is similarly piped to a second image mask based on chrominance features of the image. These two processing nodes together allow the user to specify a luminance and color range of the image to create a depth selection mask indicating the weight of each pixel as described in detail in Processing Step 3. It should be noted that any number of selection parameters, including luminance and/or chrominance or other operations, may be parameters in one processing node, or multiple processing nodes may be used for each of multiple parameters.

In this example, a first operator 1208 ("Polygon1") and a second operator 1209 ("Polygon2") are applied to fourth processing node 1207 ("ChromaMask"). As shown in the description of Step 4, above, these operators allow the user to modify the mask by bounding the image mask by the drawing of polygonal shapes to exclude portions of the image to be processed. This results in a modified mask and/or image selection map that gets passed to the next processing step. It should be noted that these processing operators may be implemented as operators in one particular processing node (e.g., chrominance) or may themselves be implemented in individual processing nodes.

In a fifth processing node 1210 ("DepthGen1"), the depth selection mask is applied to the working (LE) image 1203 and a weighted vector displacement is performed as described by Step 5 to achieve the depth generation in accordance with the embodiments herein described.

The LE image may then go through one or more selection and displacement operations (e.g., node 1211 and node 1212). Some may require further mask adjustment, and some may not. It should be noted that previous processing steps (e.g., ChromaMask) may be duplicated in their entirety, or duplicated then adjusted, to be incorporated into subsequent processing steps in the image processing pipeline.

Ultimately, the LE image gets piped to an output processing node 1213 ("FileSaveLE"), and RE image 1204 gets piped to an output processing node 1214 ("FileSaveRE"). These output processing nodes write the piped output, individually, to a memory 1215, such as, for example, a disk or other storage media in one of a variety of formats. In some embodiments, the LE and RE images incorporate a time signal so that they may be combined when viewing the final stereo image sequence on the stereo apparatus herein described. Another processing node 1216 ("StereoImageStack") may also combine the images prior to writing them to storage or viewing on the video monitor 1217 for editing purposes. In some embodiments, distortion may have been applied to the RE image by node 1218.

Any one of these nodes in the flowchart may be manually or dynamically rearranged or manipulated to another portion of the sequence. The Interface of the present invention also incorporates many functions of industry compositing programs for viewing the editing process, for example, the Interface permits a user to drag a processing node into a display area on the video monitor to automatically display the output of that processing node in the current flow. This lets the user view the output at any point in the process, and when any parameter upstream of it is changed, the flow updates along with the displayed output image. Any separate channel (RGB) in the image may be viewed by itself, including the alpha (mask) information.

Exemplary Illustration of the Process

The selection or segmentation methodology of the disclosed process allows the artist to select 'volumes' of an attribute or scene, rather than outlining selected elements. Consider a shaded box—each side a standard color—Red, Green, Blue. In it's most simple creation, by selecting or isolating the red, green or blue channel, the artist can select those sides of the box independently without rotoscoping. However, this would result in 3 flat areas of the image. Fortunately, when it comes to reality, all objects have gradients of color and variations which allow us to obtain the detail required.

Consider next the common appearance of an actor's face in film making. The blood vessels of the face generally radiate out towards or away from the actors nose, depending on their current performance. Using the Red channel, and some simple modifiers whether they be contrast, gamma, luminance of that channel, or operators such as addition and subtraction for other regions, the artist can obtain a gradient across the actors face, following the contours of the actual image which, when applied at Step 5, allow the weighted displacement to create a depth of considerable volume and detail, or a very realistic three-dimensional face. Because the artist does not need to build 3D geometry, the face does not need to be modeled, or tracked throughout the shot; the selection and segmentations are the actor's face, and remain a consistent selection throughout the range of frames in shots, and potentially, throughout the sequence.

An artist may select the red parts of an actor's face, the pink from the actor's arms, the blue from the jeans, the yellow from a shirt, and obtain a complete dimensional image with more than just a cutout; and, group those objects in a way that makes sense. By a complete selection of all the assets that make out the person, then all the pieces that make that person's face, then the elements that are projecting forward—for example, the hands and/or key parts of the face such as the nose—the artist can manipulate all at ease by simple manipulation of their corresponding controls, thus affecting each individual selection, each sub-selection, the group as a whole, or any combination of these selections or sub-selections.

Additionally, consider a large room filled with boxes and lit from above, for example, in a warehouse. Selecting the luminance channel would create a volume from the top down, which is not appropriate for the creation of a stereo image. However, when combined either through addition, multiplication or subtraction with the natural haze that exists in reality as objects move away, and a depth gradient is created. By combining selections of color and shape, whether they be from Hue, Luminance, Saturation, Red, Green Blue, Cyan, Magenta, Y, U, V, or other channels or ranges of spectrum of light, or the frequency of the shape and texture, the bases of the boxes may be included in the segmentation mask in a manner to appropriately complete the stereo effect.

Consider the depiction in FIG. 13A of a boy with a bow. The tip of the arrow is shown in the foreground, the boy's body in the mid-ground, and some brush or leaves in the background. As depicted by FIG. 13B, a first depth selection mask is generated based on a value range, including brightness and color channel and other image qualities, to distinguish the background scenery from the boy. The working image is adjusted until the background has the greatest luminosity (approaching 1), while the boy and the arrow tip have the least luminosity (approaching 0). Once the image is adjusted such that the mid and foreground elements take on the least luminosity, the segment is further adjusted so that the objects in the background element (for example, the leaves on a tree) that are closer to the camera also represent themselves with a lower luminosity, further distinguishing the background scene. The background element, as illustrated in FIG. 13B, is then defined and saved as an image selection choice for a final depth selection mask.

A second depth selection mask is generated for the tip of the arrow in the same manner. As depicted by FIG. 13C, the image is adjusted such that all the elements are darkened except the tip, which will have the greatest luminosity and later be shown projecting out toward the viewer. The arrow tip element is then defined and saved as an image selection choice for the final depth selection mask. As depicted by FIG. 13D, the background element and arrow tip element can then be selected and subtracted from the image to generate a third segment. Similarly, this remaining segment is adjusted based on a value range, including brightness and color channel and other image qualities, to assign a greater luminosity to those features of the boy and his clothing that are closer to the camera, to create a third depth selection mask.

In this example, a depth value of 0 to 1 is assigned to each pixel location of each image segment, a zero value representing the darkest area of the element. When the depth selection mask is applied to selected element of a working image, those pixel locations of the working image are shifted using the vector displacement described herein in accordance with the depth selection value assigned by the corresponding pixel location of the depth selection mask. In some embodiments, it is preferable to combine multiple segments and/or depth selection masks. In the example depicted by FIG. 13E, wherein three segments are combined, the selected segments are combined such that the areas with the highest luminosity (approaching 1) are closest to the viewer and is the areas with the least luminosity (approaching 0) are furthest from the viewer, across all the maps. The background segment of FIG. 13B is thus inverted to align with the values of the mid-ground segment. As such, a depth value of 1 in the segment representing the background element will be equal to a value of 0 in the segment representing the boy, such that the two segments, when combined into one depth selection mask, appear as one image having a continuous gradient. In some embodiments, each segment is assigned to a depth selection mask and will have a control (for example, a slider) associated with it to uniformly adjust the depth values from their initial values. When combined, another control may adjust all combined segments simultaneously as one depth selection mask, while other controls adjust each segment individually. In some embodiments, the artist may push everything back by inverting the entire depth selection mask. The value range from 0 to 1 or from 1 to 0 describing the luminosity or depth value assigned is arbitrary, and can vary depending on the approach chosen.

If the maximum displacement for any element in an image is, for example, 30 pixels, then each pixel of the working image corresponding to those values having the greatest depth value (for example, equal to 1) could be displaced as much as 30 pixels, while those pixels corresponding to values having the least depth value (for example, equal to 0) may not be shifted, or, in some embodiments, are negatively shifted, for example, by −5 pixels. This shifting by the weight displacement may stretch or compress the pixels in the vicinity of the shift, or, in some embodiments, move nearby pixels with a different value in a different direction. The quality, size and position of compression or stretching is controllable by the artist, if required, to maximize the stereo aspect of the image while minimizing any visual errors. Preferably, in some embodiments, the shifting is across both the LE and RE images, such that, if the maximum displacement is 30 pixels then the maximum displacement will be 15 for each image, scaling down accordingly. The inventor has discovered that the application of a blurring effect at the edges of the elements prior to the displacement may alleviate some of the inconsistencies that may be readily viewable by the human eye. The inventor has also discovered that adjusting the depth selection masks so that the compression and/or expansion of the working image occurs in areas of low frequency, for example, open sky, large bodies of water, or random areas of high frequency such as dense forest or underbrush, has an effect of further hiding any such inconsistencies that result from the weighted displacement of the image.

It is expected that the depth selection masks and depth values associated therewith will remain at least semi-constant over any given sequence of images. Thus, a sequence of 2D images may be converted to 3D with very little effort to modify the depth selection masks or weighted values. There are numerous other ways to create an overall depth selection mask for a scene. For example, the inventor has found that the software can be adjusted by processes known in the art to input a z-buffer map from a rendered animation that includes CGI and/or 3D geometry.

The disclosed process allows for a more 'real' perception of 3D for four key reasons. First, as compared to other approaches, it creates an incredibly complex level of detail and depth from volume as opposed to selecting or outlining objects which results in flat, cardboard approximations of space and depth. Second, the nature of 2D film-making is to create monoscopic depth cues such as haze, shadow and lighting (not 'flat' surfaces) to make the scene more visually interesting, which are generally difficult to deal with in standard rotoscopic selections, but are exceptionally well handled by the disclosed process. Thirdly, there is no frame by frame creation of geometry by tracking, or frame by frame manual rotoscoping. Because the image is segmented based on the image itself, the alignment of the segmentations with the image is always correct and the visual information in the final image more accurately reflects the original source material. Moreover, by reducing these steps, this process is orders of magnitude faster. When coupled with the complete lack of visible 'holes' or blank spots made by prior art which primarily focuses on shifting images, a life-like 3D representation of the 2D imagery is created at a significant reduction of time and cost.

It is important to note that due to the relatively computationally inexpensive operations being performed throughout the process disclosed herein, and the decreased level of manual control required from a human operator, it is possible to perform the entire process interactively. This is unlike other current techniques for generating stereo image pairs from monocular images. Given an active stereo hardware setup, adjustments to any step in the process can be made on the fly and its influence on the final stereo effect can be observed almost immediately.

The disclosed system and process allows the filmmaker to directly supervise both minor and gross adjustments to the stereo scenes quality and depth in an appropriate viewing environment such as a theatre, screening room, editorial or review bay very quickly. The filmmaker can take the shot to complete final, without additional effort by the company producing the work. With other prior art technologies, for example, rotoscoping and related technologies such as those described in U.S. Pat. No. 6,208,348 to Kaye, additional artist input and rendering time is required at each step.

A further advantage of the system and process of the present invention is that it enables the operator to select preset criteria established in other shots within the same sequence and apply that criteria to every shot within the sequence, often without the need to create a new selection set, or with only minor changes. For example, an artist can establish a selection criteria and appropriate depth generation on the first shot of a 20 shot sequence, and apply that value across all of the shots, frequently getting useable results. This allows the process to be fast and interactive for artists, which is incredibly important when there are thousands of shots to be completed in the relatively short schedules of Hollywood and television projects. Moreover, as technology improves, conversion of an entire monocular sequence will approach a true real-time conversion. The process disclosed herein can also be used in conjunction with other traditional practices of the prior art, even when those practices involve a level of difficulty far in advance of this process. For example, 3D geometry of an actors face might be rendered, tracked and animated over every frame in the movie, and then the system and process of the present invention applied to transform the rendered frames from 2D to 3D, or to fix inconsistencies in the perception of the 3D geometry created by the prior art practice.

Yet another advantage of the system and process of the present invention is that it enables the visual effects artist to easily adjust and/or correct elements within true stereoscopic captured material (film shot by a true stereo 3D camera); combine 3D filmed elements, as well as 2D to 3D converted elements, with greater facility and ease; and, correct 3D images shot in stereo by providing the ability to adjust inconsistencies or remove unwanted artifacts that result from unfavorable camera alignment. For instance, the system and process has been used to repair a damaged source image resulting from an out-of-focus LE (Left Eye) recording lens by using the damaged LE image as a reference and applying the process to the unspoiled RE image to create a new complimentary and undamaged LE image.

The headings and captions are provided for convenience only and are not to be construed as limiting the scope of the invention or the embodiments thereof. The forgoing description of embodiments of the invention are not intended to be exhaustive or to limit the invention to the precise form disclosed. It should be apparent to those of ordinary skill in the art that various adaptations and modifications may be made without departing from the scope or spirit of the invention. It is intended that the scope of the invention not be limited by the embodiments shown and described, but only by the claims appended hereto.

I claim:

1. A process for creating a three dimensional media projection from a two-dimensional image, comprising:
copying a two-dimensional image to create a working image of the two dimensional image;
creating a depth selection mask associated with at least one characteristic of the working image and associated with at least a portion of the working image, including:
selecting a set of image features, and
determining a real value in a normalized range for the set of selected image features for each pixel location in the portion of the working image;
determining a vector field of each pixel of the portion of the working image;

applying the depth selection mask to the vector field of the portion of the working image to create a weighted displacement mask having a displacement vector associated with each pixel of the portion of the working image, the displacement vector having a magnitude and direction;

displacing each pixel of the portion of the working image in accordance with the magnitude of the vector associated with that pixel to create a modified working image; and creating a stereo pair of images by pairing the two dimensional image with the modified working image.

2. The process of claim 1, further comprising:
displaying on a video display the modified working image as part of the pair of stereo images.

3. The process of claim 1, further comprising:
wherein the the displacement has a magnitude that is relative to a perceived depth of the portion and includes a maximum magnitude of displacement being assigned to each pixel location having a first selected depth value and a minimum magnitude of displacement being assigned to each pixel location having a second selected depth value and an intermediate magnitude of displacement being assigned to a pixel location having a third selected depth value, the third selected depth value selected from a range between the first and second depth values.

4. The process of claim 3, further comprising:
creating a boundary on at least one part of the image mask so as to preclude assigning the depth values to non-selected pixel locations outside the boundary.

5. The process of claim 1, wherein creating the depth selection mask associated with at least one characteristic characteristic of the working image includes:
selecting an image characteristic from a group consisting of hue, luminance, saturation, and color; and
generating an image representation of a weighted distribution of the image characteristic in the working image, wherein the real values are assigned to each pixel location in accordance with the weighted distribution.

6. The process of claim 1, further comprising:
comparing a portion of an image feature present in the working image with a portion of the depth selection mask and a selected range of depth values; and
changing the depth value at a selected pixel of the depth selection mask based on a location of the selected pixel relative to the image feature.

7. The process of claim 1, further comprising:
applying the depth selection mask to a second image to assign each depth value to a corresponding pixel location in the second image;
displacing by distortion of the second image a portion of the second image in a direction opposite the displacement of the working image; and
replacing a selected image in a stereo pair of images with the second image.

8. The process of claim 1, further comprising:
providing a second image associated with the working image;
creating a depth selection mask associated with at least one characteristic of the second image and associated with at least a portion of the second image, including:
selecting a set of image features, and
determining a real value in a normalized range for the set of selected image features for each pixel location in the portion of the second image;
determining a vector field of each pixel of the portion of the second image;

applying the depth selection mask to the vector field of the portion of the second image to create a weighted displacement mask having a displacement vector associated with each pixel of the portion of the second image, the displacement vector having a magnitude and direction;

displacing each pixel of the portion of the second image in accordance with the magnitude of the vector associated with that pixel to create a modified second image; and replacing the second image in a stereo pair of images with the modified second image.

9. The process of claim 8, wherein the three-dimensional media projection is created when the modified working image and the modified second image are viewed as a pair of stereo images through a stereoscopic viewing device.

10. The process of claim 8, wherein the displacement of the second modified image is in a direction opposite the displacement of the modified working image.

11. The process of claim 10, wherein the magnitude of the displacement of the modified second image is substantially equal to the magnitude of the displacement of the modified working image.

12. A system for creating a three-dimensional media projection from a two-dimensional digitized image, comprising:
a video monitor configured to display a stereo pair of images in response to a video signal;
an input device configured to generate input signals, and configured to select a working image from a group of images, the working image being a copy of an image selected from the group of images, and configured to select characteristics of the working image;
a control configured to generate control signals, and configured to assign a value to a characteristic selected by the input device; and
a processor in operable communication with the monitor, the input device and the control, the processor configured to displace a portion of the working image by
creating a depth selection mask associated with at least one characteristic of the working image and associated with at least a portion of the working image, including
selecting a set of image features and determining a real value in a normalized range for the set of selected image features for each pixel location in the portion of the working image, determining a vector field of each pixel of the portion of the working image,
applying the depth selection mask to the vector field of the portion of the working image to create a weighted displacement mask having a displacement vector associated with each pixel of the portion of the working image, the displacement vector having a magnitude and direction,
displacing each pixel of the portion of the working image in accordance with the magnitude of the vector associated with that pixel to create a modified working image; and
wherein the video monitor, in response to a second input signal, displays the modified working image as part of the stereo pair of images.

13. A system of claim 12, further comprising:
the processor further configured to create the depth selection mask associated with characteristics of the working image and associated with at least a portion of the working image in response to a second input signal, and to assign a depth value to each pixel location of the working image that is associated with the depth selection mask, the depth value being chosen from a specified range of values, wherein the magnitude of the displacement being relative to a value received by the control includes a control value received by the control multiplied by a scaling factor determinable at each pixel location according to the depth value assigned to each pixel location.

14. A system of claim 13, further comprising:

the processor further configured to, in response to a second input signal, apply the depth selection mask to a second image to assign each depth value to a corresponding pixel location in the second image;

the processor further configured to displace in a direction opposite the displacement of the working image a portion of the second image by distortion of the second image; and the processor further configured to replace a selected image in a stereo pair of images with the second image.

15. The system of claim 12, further comprising:

the processor being further configured, on receiving a command from the input device, to distort at least part of a selected image from the stereo pair of images by applying a distortion to the selected image.

16. The system of claim 12, further comprising:

the processor being further configured, on receiving a command from the input device, to remove a distortion from at least part of a selected image from the stereo pair of images by applying a distortion to the selected image.

17. The system of claim 12, wherein the processor is configured, on receiving first commands from the input device, to select a first and second portion of the working image as candidates for displacement, and to assign the first and second portions to first and second controls, wherein the first control is operational to displace the first portion and the second control is operational to displace the second portion.

18. The system of claim 12, further comprising:

a stereoscopic viewing device; and an image storage for storing an image stream of multiple working images, wherein the processor is configured to, in response to a second input signal, receive the image stream from the storage and display the image stream on the video monitor to generate a three-dimensional motion picture when viewed through the stereoscopic viewing device.

* * * * *